(12) United States Patent
Zugic et al.

(10) Patent No.: US 12,509,352 B2
(45) Date of Patent: Dec. 30, 2025

(54) REACTOR SYSTEMS FOR ENDOTHERMIC REACTIONS

(71) Applicant: Lydian Labs, Inc., Cambridge, MA (US)

(72) Inventors: Branko Zugic, Cambridge, MA (US); Joseph Rodden, Cambridge, MA (US); Neil Ide, Cambridge, MA (US); Joseph Benjamin, Cambridge, MA (US); Zachary T. Modest, Cambridge, MA (US); Geoffrey Vaartstra, Cambridge, MA (US)

(73) Assignee: Lydian Labs, Inc., Cambridge, MA (US)

( * ) Notice: Subject to any disclaimer, the term of this patent is extended or adjusted under 35 U.S.C. 154(b) by 0 days.

(21) Appl. No.: 19/038,495

(22) Filed: Jan. 27, 2025

(65) Prior Publication Data

US 2025/0243071 A1     Jul. 31, 2025

Related U.S. Application Data

(60) Provisional application No. 63/625,165, filed on Jan. 25, 2024.

(51) Int. Cl.
    *C01B 32/40*     (2017.01)
    *C01B 3/04*     (2006.01)

(52) U.S. Cl.
    CPC ............. *C01B 32/40* (2017.08); *C01B 3/042* (2013.01); *C01B 2203/0883* (2013.01)

(58) Field of Classification Search
    CPC .... C01B 3/00; C01B 3/02; C01B 3/04; C01B 3/042; C01B 32/00; C01B 32/40; C01B 2203/00; C01B 2203/08; C01B 2203/0872; C01B 2203/0883
    See application file for complete search history.

(56) References Cited

U.S. PATENT DOCUMENTS

| | | | |
|---|---|---|---|
| 3,477,827 A | 11/1969 | Mott | |
| 3,541,729 A | 11/1970 | Dantowitz | |
| 7,611,579 B2 * | 11/2009 | Lashmore | B82Y 40/00 117/921 |

(Continued)

FOREIGN PATENT DOCUMENTS

| | | |
|---|---|---|
| CN | 105183039 A | 12/2015 |
| GB | 1547810 A | 6/1979 |

(Continued)

OTHER PUBLICATIONS

Abbas, et al., "Experimental assessment of reverse water gas shift integrated with chemical looping for low-carbon fuels", Journal of CO2 Utilization 83 (2024) 102775.

(Continued)

*Primary Examiner* — Natasha E Young
(74) *Attorney, Agent, or Firm* — Jeffrey Schox; Randy Mehlenbacher

(57) ABSTRACT

An electrified reactor system can include optional insulation, an optional pressure housing, electrical connections to/from the catalytic module, a preheater, one or more heat exchangers, a reaction zone (e.g., a reaction module, a catalyst module, etc.), one or more optional preheaters, and an operation switcher (e.g., valve, rotatory switch, controller, etc.).

21 Claims, 18 Drawing Sheets

(56) References Cited

U.S. PATENT DOCUMENTS

| | | | |
|---|---|---|---|
| 8,926,721 B2 * | 1/2015 | Bingue | C01B 17/046 |
| | | | 423/644 |
| 11,866,328 B1 | 1/2024 | Sheludko et al. | |
| 12,157,104 B2 | 12/2024 | Zugic | |
| 2019/0118264 A1 | 4/2019 | Qi et al. | |
| 2020/0354216 A1 | 11/2020 | Mortensen | |
| 2021/0113983 A1 | 4/2021 | Mortensen et al. | |
| 2021/0238035 A1 | 8/2021 | Mortensen et al. | |
| 2021/0318177 A1 | 10/2021 | Culbertson et al. | |
| 2022/0306559 A1 | 9/2022 | Mortensen et al. | |
| 2023/0002690 A1 | 1/2023 | Klaassen et al. | |
| 2023/0159326 A1 | 5/2023 | Surma et al. | |
| 2025/0001381 A1 | 1/2025 | Zugic et al. | |

FOREIGN PATENT DOCUMENTS

| | | |
|---|---|---|
| WO | 2019228797 A1 | 12/2019 |
| WO | 2020185744 A1 | 9/2020 |
| WO | 2021110809 A1 | 6/2021 |
| WO | 2022221740 A1 | 10/2022 |
| WO | 2022241260 A1 | 11/2022 |
| WO | 2024086300 A1 | 4/2024 |

OTHER PUBLICATIONS

Cao, et al., "CO2 conversion to syngas via electrification of endothermal reactors: process design and environmental impact analysis", Energy Conversion and Management, vol. 265, Aug. 1, 2022, 115763.

González-Castaño, et al., "The reverse water gas shift reaction: a process systems engineering perspective", The Royal Society of Chemistry 2021, React. Chem. Eng., DOI: 10.1039/d0re00478b.

Idamakanti, et al., "Electrified Catalysts for Endothermic Chemical Processes: Materials Needs, Advances, and Challenges", ACS Eng. Au 2024, 4, 71-90.

Ishida, et al., "CO2 Recovery in a Power Plant With Chemical Looping Combustion", Energy Convers. Mgmt., vol. 38, Suppl., pp. S187 SI92, 1997.

Maporti, et al., "Towards sustainable hydrogen production: Integrating electrified and convective steam reformer with carbon capture and storage", Chemical Engineering Journal 499 (2024) 156357.

Theofanidis, et al., "On the Electrification of CO2-Based Methanol Synthesis via a Reverse Water-Gas Shift: A Comparative Techno-Economic Assessment of Thermo-Catalytic and Plasma-Assisted Routes", Ind. Eng. Chem. Res. 2024,63,12035-12052.

Trivino, et al., "Transforming CO2 to valuable feedstocks: Emerging catalytic and 2 technological advances for the reverse water gas shift reaction", Chemical Engineering Journal, vol. 487, May 1, 2024, 150369.

Wismann, et al., "Electrified methane reforming: A compact approach to greener industrial hydrogen production", Science 364, 756-759 (2019) May 24, 2019.

* cited by examiner 1301  1302                     1303        1304  1305   1306

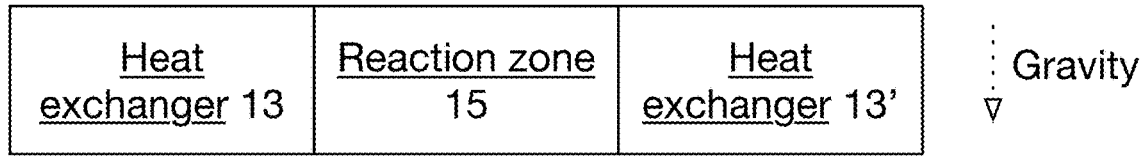
FIGURE 18A
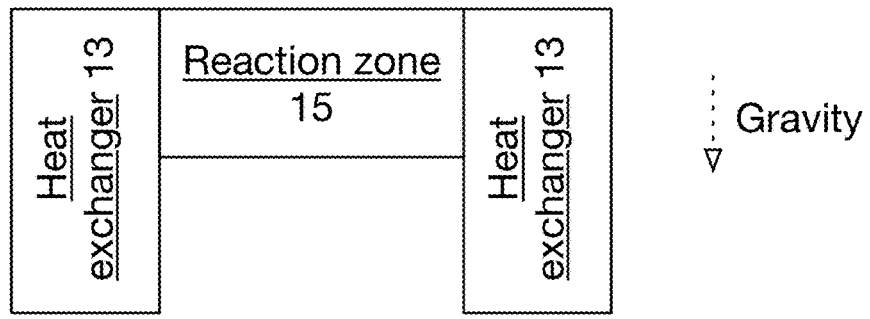
FIGURE 18B
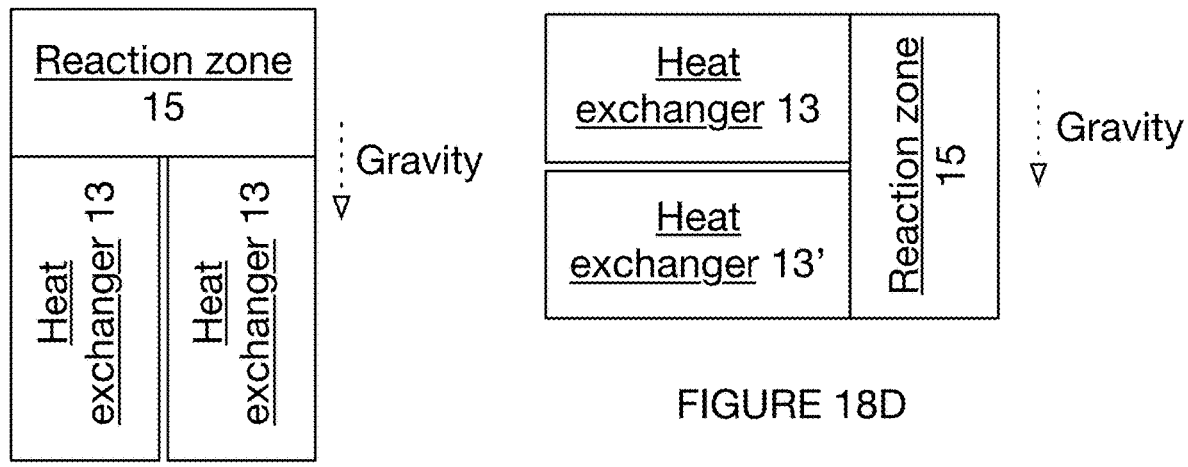
FIGURE 18C
FIGURE 18D

REACTOR SYSTEMS FOR ENDOTHERMIC REACTIONS

CROSS-REFERENCE TO RELATED APPLICATIONS

This application claims the benefit of U.S. Provisional Application No. 63/625,165 filed 25 Jan. 2024, which is incorporated in its entirety by this reference.

TECHNICAL FIELD

This invention relates generally to the thermal reactor field, and more specifically to a new and useful system and method in the thermal reactor field.

BACKGROUND

Traditional catalytic reactor systems are heated via the external combustion of fuel. The heat of combustion is transferred into the process stream through the reactor wall by radiative and conductive heat transfer mechanisms to drive reactions inside the system. This allows the heat generation mechanism to be decoupled from the catalytic surface and process gas but suffers from poor heat utilization and generates large amounts of $CO_2$ from the combustion process. Heat transfer efficiencies of 50% or less are typical of these systems. There is thus a need for more efficient and economic ways to heat reactor systems.

BRIEF SUMMARY

In certain embodiments, the disclosure provides an electrified reactor system with integrated heat recovery for high overall energy efficiency. The system may use several heat exchange configurations to recover heat and may include any number of separately heated zones that are precisely controlled with heating (e.g., electric heating, stored solar salt, nuclear water cooling, etc.). The intentional creation of multiple temperature zones through a combination of the heating and heat recovery configurations are also used in certain embodiments to effect other relevant unit operations such as physical and chemical separations or secondary catalytic processes.

BRIEF DESCRIPTION OF THE FIGURES

FIGS. 18A-18E are schematic representations of examples of a thermal reactor with different orientations relative to a gravity vector.

DETAILED DESCRIPTION

The following description of the embodiments of the invention is not intended to limit the invention to these embodiments, but rather to enable any person skilled in the art to make and use this invention.

1. Overview

Figure 14:
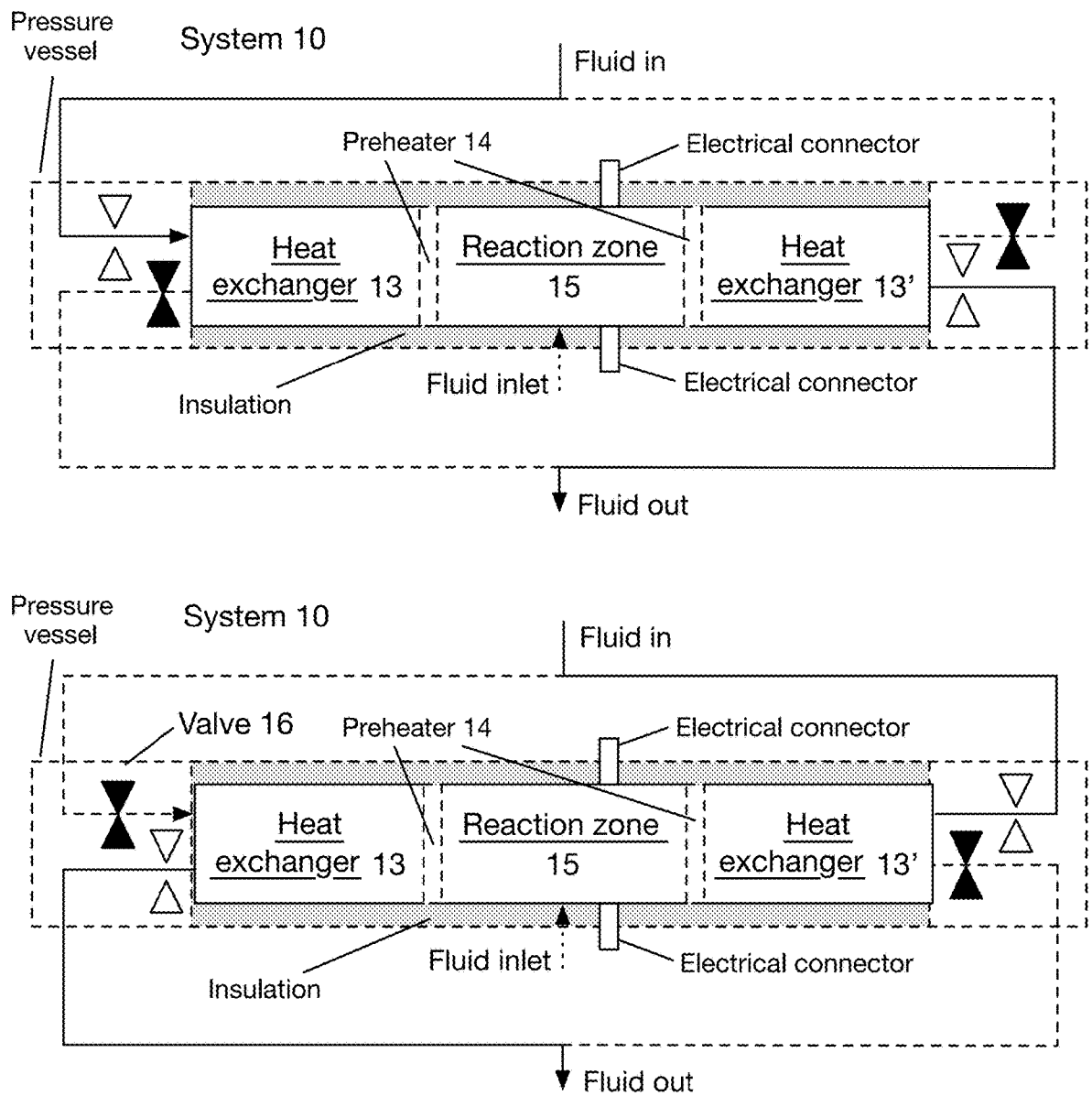
FIG. 14 is a schematic representation of an exemplary reactor system.

As shown in for example in FIG. 14, an electrified reactor system can include optional insulation, an optional pressure housing, electrical connections to/from the catalytic module, a preheater, a first heat exchanger 13 (e.g., reactant heating region or reactant cooling region depending on a fluid flow direction), a second heat exchanger 13' (e.g., reactant cooling region or reactant heating region depending on a fluid flow direction), a reaction zone 15 (e.g., a reaction module, a catalyst module, etc.), an optional preheater, an operation switcher (e.g., valves 16, rotatory switch, controller, etc.), an optional separation system (e.g., filter, water separator, etc.), and/or other suitable components.

In some embodiments, heat can be provided to the electrified reactor system (e.g., to the reaction zone thereof) by resistive, inductive, microwave, or plasma-based heating with a low-cost heat exchanger system incorporated into the reactor vessel to recover heat not converted to chemical energy (e.g., by transferring heat from outgoing gas to incoming gas). Additionally or alternatively, other heat production and/or heat transfer means can be used (such as stored solar salt, nuclear cooling water, etc.). The reactor system often operates at standard pressures or greater (e.g., between 1 atm and 100 atm). However (e.g., to control a product ratio, to control a byproduct recovery, etc.), the reactor system could be operated under reduced pressure (e.g., vacuum, pressure less than 1 atm, etc.).

The system is preferably used for reactions conducted at high temperatures (e.g., $\geq 800°$ C., $\geq 1000°$ C., $\geq 1100°$ C., $\geq 1200°$ C., $\geq 1500°$ C., values or ranges therebetween, etc.), such as endothermic reactions. For example, the system can be used for reverse water gas shift reaction (e.g., $H_2+CO_2\rightarrow H_2O+CO$), steam methane reforming ($CH_4+H_2O\leftarrow\rightarrow CO+3H_2$), dry methane reforming ($CH_4+CO_2\leftarrow\rightarrow 2CO+2H_2$), bi-reforming, hydrocarbon reforming (e.g. $C_xH_y+H_2O\leftarrow\rightarrow xCO+(2x+y)/2\ H_2$), thermal water splitting, Kværner process ($C_nH_m\rightarrow nC+m/2H_2$), Haber process ($N_2+3H_2\leftarrow\rightarrow 2NH_3$), and/or other suitable reactions and/or processes. In some variants, the system can perform a single reaction. In other variants, the system can perform a plurality of reactions simultaneously (e.g., by providing a fluid feed with a plurality of reactants, by providing a plurality of reactants from different processing streams, by providing a plurality of reaction modules within the reaction zone where the reaction modules can be operated at different temperatures and/or with different catalysts, etc.). For instance, the system can perform reverse gas water shift reaction and hydrocarbon reforming (e.g., of hydrocarbons with short carbon chains such as C1-C4, C1-C5, C1-C7, C1-C8, C2-C8, methane, ethane, propane, butane, pentane, hexane, heptane, octane, mixtures or unsaturated variants thereof, etc.).

2. Technical Advantages

Variants of the technology can confer one or more advantages over conventional technologies.

First, variants of the technology use renewables as the main source of energy in place of fossil fuels for a chemical production system. These processes preferably have a high efficiency (e.g., energy efficiency, single-pass yield, etc.) for the products (e.g., to be competitive with fossil fuel-derived analogues). For instance, to promote endothermic reactions, energy provided to the system in the form of electricity can be converted to heat using any number of techniques (e.g., resistive, microwave, induction, plasma, and other electrical heating techniques) with relatively high efficiency and to maintain high system level efficiency (e.g., ≥80%), heat not utilized in the chemical transformation of interest can be recovered through the use of heat exchange.

Second, variants of the technology can enable heat exchangers to operate at high temperatures (e.g., ≥1000° C.). Traditional types of heat exchangers (e.g., shell-and-tube, shell-and-plate, plate-fin, etc.) can be limited by the types of materials they can be made from. For instance, to achieve temperatures exceeding 800° C.), expensive nickel-based superalloys (e.g., Inconel, Haynes 230, etc.) can be used. However, at high temperatures and in the presence of certain gas components (e.g., synthetic gas (syngas), steam, carbon monoxide, hydrogen, etc.), alloying elements (e.g., aluminium, chromium, silicon, etc. that can form oxide scales) can undergo and/or can be insufficient to prevent degradation phenomena (e.g., metal dusting, high temperature hydrogen attack, etc.). Metallic heat exchangers can be subject to limited stream to stream differential temperature and inlet to outlet differential temperature due to the thermal expansion of metals causing failure if these limits are exceeded. Existing reactor heat exchangers have specific wear components that require periodic replacement at great expense and extended downtime due to the corrosion and other wear mechanisms of metal at high temperature. Ceramic materials can be limited by manufacturing capabilities and/or can be prone to leakage and/or failure due to their porosity and brittleness. Additionally, many heat exchange options require a second unit operation for heat transfer back to the process, which increases the cost of the overall system and creates opportunity for energy loss. For example, waste heat boilers can only achieve a maximum temperature significantly lower than the reaction temperatures required in many chemical reactions. Some variants of the technology can overcome these limitations by using a regenerative heat exchanger that uses a ceramic heat storage material. Note, that in some variants, a plurality of heat exchangers can be leveraged using lower cost or simpler heat exchanges (such as nickel-based superalloys, metals, ceramics, etc.) in lower temperature heat exchange regions and higher temperature heat exchange regions.

Third, in some variants of the technology, the heat exchange regions can confer additional functionality. For instance, particularly but not exclusively in lower temperature regions of the heat exchanger (e.g., portions of the heat exchanger(s) distal the reaction module), a heat storage material that can reversibly sorb one or more fluid species can act to filter the fluid stream and can act as a source for material within the fluid stream (e.g., when the heat exchanger operation switches). For instance, a heat storage material can include calcium oxide and/or other materials that can sorb carbon dioxide (e.g., selectively sorb a greater portion of carbon dioxide than other materials within the fluid stream such as hydrogen, carbon monoxide, water, etc.) that is not reacted within the reaction module. When the outlet operation switches to inlet performance, the calcium oxide and/or other materials that can sorb carbon dioxide can then release carbon dioxide into the fluid stream to undergo a reaction within the reaction module. However, other suitable materials within the fluid stream can be sorbed and/or desorbed (e.g., to control a composition of the fluid stream while also controlling a temperature of the fluid stream).

Fourth, the inventors have found variants of the technology that can be leveraged for reactor systems that are powered by renewable energy, capable of accessing the high temperatures (e.g., greater than 600° C.) required for key endothermic reactions (e.g., steam reforming, reverse water-gas shift, dry reforming, hydrocarbon cracking, etc.), capable of recovering heat in a cost-effective manner in a single unit operation, and are compatible with demanding process conditions (e.g., high temperature syngas environments). Moreover, these thermal reactor systems are preferably flexible, enabling operation across a range of gas flows from 0-100% (or subsets thereof such as 10-100%, 30-100%, etc. where 100% can refer to a maximum mass volume, etc. of reactants that can be processed and/or products that can be produced). In some variations, 100% can refer to a start of life for the thermal reactor systems. In other variations, the thermal reactor systems can accommodate greater than 100% flow (e.g., a sacrifice to efficiency; for short periods of time such as on the order of seconds, minutes, hours, or days; etc.) such as 105%, 110%, 120%, 125%, 150%, and/or other suitable percentages (e.g., to accommodate reactor degradation during use, to extend useable lifetime, etc.). In a specific example, the reactor system can leverage a regenerative heat exchange system (e.g., as shown for example in FIG. 14).

However, further advantages can be provided by the system and method disclosed herein.

4. System

As shown in for example in FIG. 14, an electrified reactor system can include optional insulation (e.g., to reduce heat lost to the environment from the reactor system such as ceramic fibre, firebrick, mineral wool, mica, microporous insulation, slag, basalt, fiberglass, etc.), an optional pressure housing (e.g., a stainless steel, Inconel, Hastelloy, Incoloy, Monel, Nichrome, Nimonic, Stellite, or other suitable material enclosing the other components), electrical connections to/from the catalytic module (e.g., electrical couplers, electrodes, etc.), a preheater, a first heat exchanger 13 (e.g., reactant heating region or reactant cooling region depending on a fluid flow direction), a second heat exchanger 13' (e.g., reactant cooling region or reactant heating region depending on a fluid flow direction), a reaction zone 15 (e.g., a reaction module, a catalyst module, etc.), an optional preheater, an operation switcher (e.g., valves 16, rotatory switch, controller, etc.), an optional separation system (e.g., filter, water separator, etc.), and/or other suitable components.

The insulation can be designed to control the phase of the product and/or reactant mixture, for instance to avoid undesirable condensation within the heat exchange media (e.g., in the heat exchanger) and/or the reaction module. In one specific example, the insulation can include a refractory material lining on the interior of the pressure vessel wall. However, other suitable insulation can be used.

The system is preferably used for reactions conducted at high temperatures (e.g., ≥800° C., ≥1000° C., ≥1050° C., ≥1100° C., ≥1200° C., ≥1500° C., values or ranges therebetween, etc.), such as endothermic reactions. For example, the system can be used for reverse water gas shift reaction (e.g., $H_2+CO_2 \rightarrow H_2O+CO$), steam methane reforming ($CH_4+H_2O \leftarrow \rightarrow CO+3H_2$), dry methane reforming ($CH_4+CO_2 \leftarrow \rightarrow 2CO+2H_2$), bi-reforming, hydrocarbon reforming (e.g. $C_xH_y+H_2O \leftarrow \rightarrow xCO+(2x+y)/2\ H_2$), thermal water splitting, Kværner process ($C_nH_m \rightarrow nC+m/2H_2$), Haber process ($N_2+3H_2 \leftarrow \rightarrow 2NH_3$), and/or other suitable reactions and/or processes. In some variants, the system can perform a single reaction. In other variants, the system can perform a plurality of reactions simultaneously (e.g., by providing a fluid feed with a plurality of reactants, by providing a plurality of reactants from different processing streams, etc.). For instance, the system can perform reverse gas water shift reaction and hydrocarbon reforming (e.g., of hydrocarbons with short carbon chains such as C1-C4, C1-C5, C1-C7, C1-C8, C2-C8, methane, ethane, propane, butane, pentane, hexane, heptane, octane, mixtures or unsaturated variants thereof, etc.).

Figure 15A:
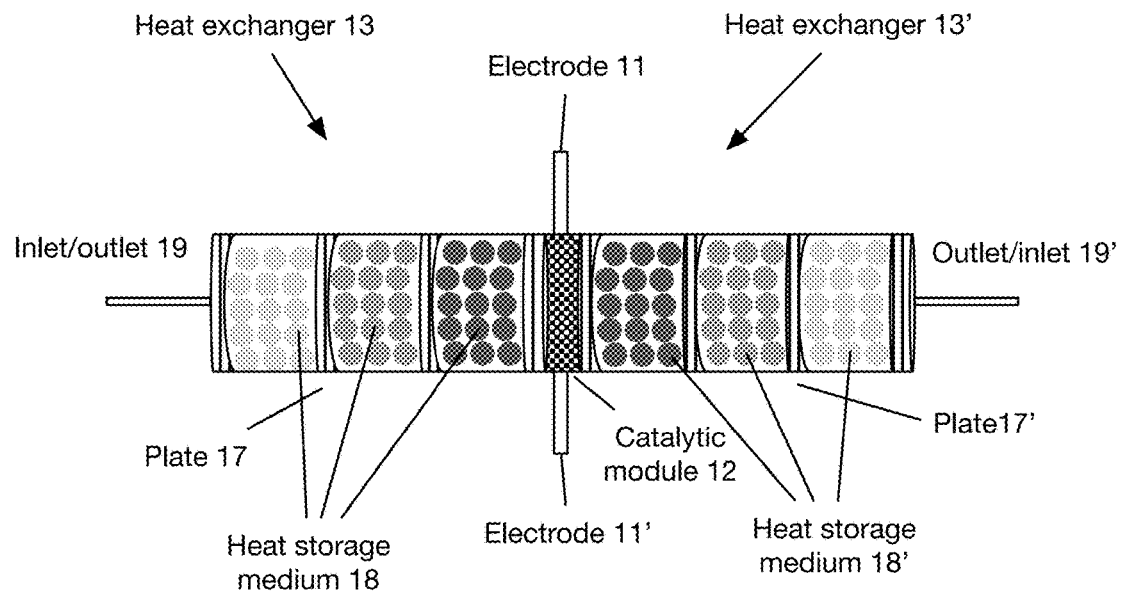
FIGS. 15A and 15B are schematic representations of examples of reactor systems.
Figure 15B:
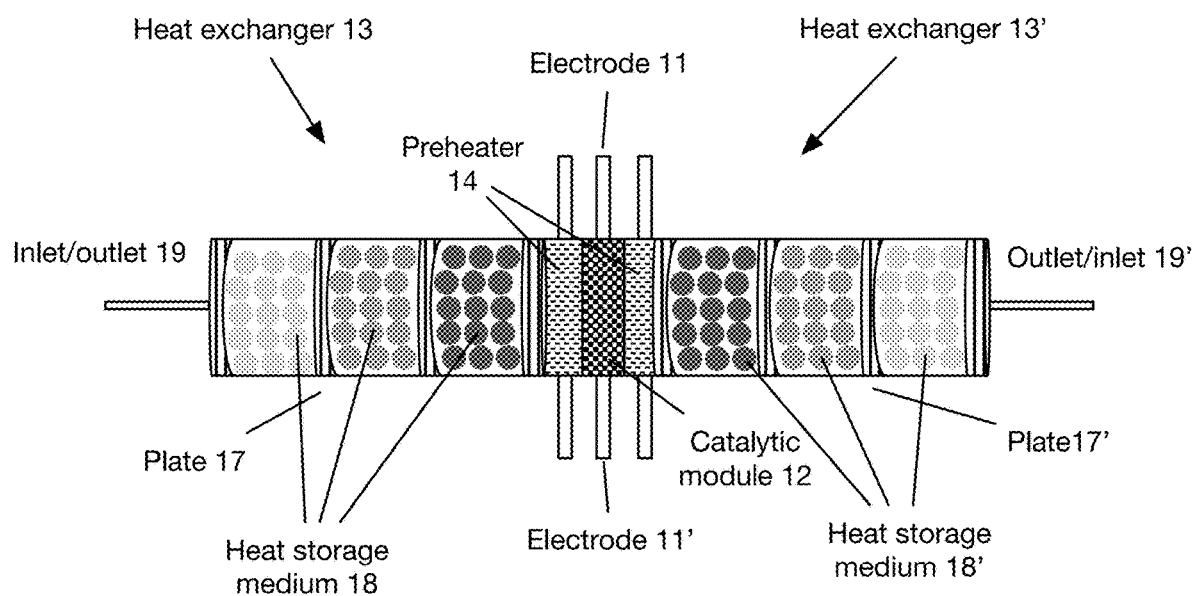
Figure 18E:
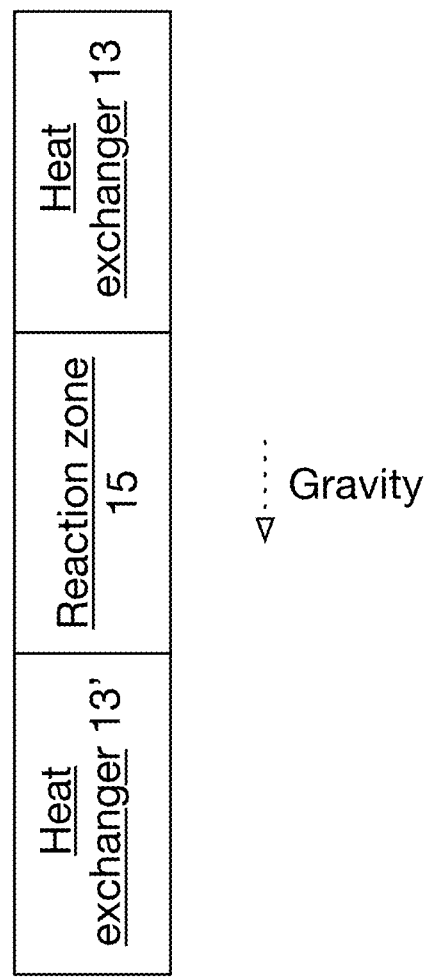

The reactor system is preferably substantially symmetric (e.g., mirror symmetric, inversion symmetric, rotation symmetric, etc. as shown for example in FIG. 15A or FIG. 15B) about the reaction module. In one example of a substantially symmetric reactor system, functionality (e.g., temperature, sorption, etc.) across the reactor system can be symmetric (whereas the exact design could vary to achieve the same effect). In another example of a substantially symmetric reactor system, chemical and/or thermal elements can be symmetric about the reaction module whereas mechanical components (e.g., fasteners, sensors, etc.) need not be symmetric. However, the reactor system can be asymmetric. The reactor system can be aligned parallel to a gravity vector (as shown for example in FIG. 18E), perpendicular to a gravity vector (as shown for example in FIG. 18A), and/or can have other suitable arrangement relative to a gravity vector (as shown for example in FIG. 18B, FIG. 18C, and/or FIG. 18D). In variants where the heat exchanger(s) are perpendicular to the gravity vector (e.g., as shown for example in FIG. 18A or FIG. 18D), the heat exchangers can include a drain port (e.g., for removing liquid from product gas). In variants where the heat exchangers are parallel with (or at a sufficient angle relative to) the gravity vector (as shown for example in FIG. 18B, FIG. 18C, or FIG. 18E), any liquid formed during the cooling of the product gas can be drained by gravity. In some variants, having the reaction zone (e.g., reactor module(s), preheater(s), etc.) at an end of the thermal reactor (i.e., contacting a single end of each heat exchanger rather than being in the middle of heat exchangers such as shown for example in FIG. 18C or FIG. 18D) can be beneficial for maintaining and/or servicing the reaction zone and/or components (e.g., reaction modules, preheaters, etc.) thereof.

The reactor system can have a diameter or width between about 6 inches and 120 inches. The reactor system can have a height or depth between about 12 inches and 1200 inches. However, other suitable reactor sizes can be designed (e.g., have similar design characteristics scaled to match the reactor size).

The reaction module(s) preferably function as a site for chemical reactions to be performed. The reaction module (e.g., a catalytic element thereof) preferably achieves a high operating temperature (e.g., greater than about 500° C., 600° C., 750° C., 800° C., 900° C., 1000° C., 1050° C., 1100° C., 1250° C., 1300° C., 1500° C., 2000° C., 2500° C., etc.), which can be beneficial for driving an equilibrium of the chemical reaction to preferred products. However, the thermal reactor can operate in any suitable manner. The reactor system can include a single reaction module and/or a plurality of reaction modules (e.g., in parallel and/or in series within the same pressure vessel such as 2 reaction modules, 3 reaction modules, 5 reaction modules, 10 reaction modules, etc.).

The reaction module temperature is preferably achieved via resistive heating (e.g., Joule heating, Ohmic heating, etc.). However, the reactor temperature can otherwise be achieved (e.g., dielectric heating, induction heating, microwave heating, plasma heating, etc. for suitable catalytic elements, reaction modules, etc.).

The reaction module(s) can be cylindrical, prismatoid (e.g., pyramidal, prismatic, antiprismatic, parallelepipedal, cupolaed, frustral, cube, rectangular prism, triangular prism, pentagonal prism, etc.), toroid (e.g., square toroid, rectangular toroid, hexagonal toroid, degenerate toroid, etc.), conical, and/or can have other suitable shapes (typically but not necessarily a 3D shape with two planar broad surface ends).

The reaction module (or each reaction module in variants with a plurality of modules) preferably includes a substrate and catalytic material disposed on the substrate. The reaction module is preferably in electrical communication with one or more electrical couplers (e.g., electrodes configured to pass electricity through the reaction module or substrate thereof, where the act of passing electricity through the substrate results in heating the substrate via resistive heating). The electrical couplers can be solid, mesh, porous, and/or have other suitable shape or configuration to supply electricity to the reaction module. A cross-sectional perimeter, diameter, width, length, surface area, or other characteristic dimension is preferably substantially identical to that of the reaction module (e.g., would differ by less than 10% assuming the reaction module at the point of contact were solid), which can be beneficial for achieving even temperature within the reaction module. As a specific example, an electrical coupler can have a design such as that described in U.S. patent application Ser. No. 18/758,642 titled 'ELECTRICAL COUPLER FOR RESISTIVELY HEATED REACTOR SYSTEMS' filed 28 Jun. 2024 which is incorporated in its entirety by this reference.

The substrate functions to support the catalyst and/or heat the catalyst and/or fluid. The substrate can additionally or alternatively function to mix the fluid (e.g., by introducing turbulence into the fluid flow), increase a residence time of the fluid proximal the catalyst (e.g., by forming a tortuous pathway through the substrate), and/or can otherwise function.

The substrate is preferably formed from a refractory material, refractory metal, and/or combinations thereof (e.g., cermet). For instance, the substrate can be made carbon, silicon-carbide, tungsten carbide, molybdenum carbide, titanium carbide, vanadium carbide, chromium carbide, zirconium carbide, niobium carbide, molybdenum carbide, ruthenium carbide, rhodium carbide, hafnium carbide, tantalum carbide, tungsten carbide, rhenium carbide, osmium carbide, iridium carbide, platinum silicide, titanium silicide, vanadium silicide, chromium silicide, zirconium silicide, niobium silicide, molybdenum silicide, ruthenium silicide, rhodium silicide, hafnium silicide, tantalum silicide, tungsten silicide, rhenium silicide, osmium silicide, iridium silicide, neptunium silicide, titanium, vanadium, chromium, zirconium, niobium, molybdenum, ruthenium, rhodium, hafnium, tantalum, tungsten, rhenium, osmium, iridium, alloys or composites therebetween, oxides (e.g., titania, alumina, ceria, zinc oxide, zirconia, silica, etc.), nitrides, and/or other suitable materials (e.g., which may include dopants to modify the electrical properties of the substrate to promote uniform thermal and/or electrical distributions throughout the catalytic element).

The substrate preferably has a high specific surface area (e.g., BET surface area, such as $\geq 1$ m$^2$/g, $\geq 10$ m$^2$/g, $\geq 100$ m$^2$/g, $\geq 1000$ m$^2$/g, etc.) which can be beneficial for promoting reaction sites. However, the substrate can have any suitable specific surface area.

The substrate is preferably a porous material (e.g., a material with a porosity greater than 5%, a material with a solid material volume of at most 95%, etc.). For example, the substrate can be a foam (e.g., open-celled foam, stochastic foam, regular foam, etc.), a woven-fiber, periodic open cell structure, lattice, and/or can have any suitable structure. However, the substrate can additionally or alternatively be a solid material (e.g., mesh, ribbon, etc.), include engineered structures (e.g., a roughened surface to facilitate a large surface area, engineered or controlled through-holes, etc.), and/or can otherwise be formed.

The catalyst functions to reduce an activation energy of a target chemical reaction (e.g., increase a reaction rate, promote reaction centers, etc.). The catalyst is preferably disposed on (e.g., coated on, adhered to, absorbed on, adsorbed on, etc.) the substrate. Additionally or alternatively, the catalyst can be integrated into the substrate (e.g., where at least a portion of the catalyst material protrudes from the substrate material, can be disposed on the electrical coupler (e.g., to increase the total catalyst loading within the reaction module and/or reactor), and/or can otherwise be arranged.

Examples of catalyst materials (e.g., for the RWGS reaction) can include: oxides (e.g., iron oxide, chromium oxide, copper oxide, aluminium oxide, zinc oxide, cerium oxide, iron oxide, manganese oxide, indium oxide, nickel oxide, spinel oxides, solid solution oxides, perovskite-type oxides, composites or combinations thereof, etc.), metal catalysts (e.g., platinum, palladium, gold rhodium, ruthenium, copper, nickel, rhenium, cobalt, iron, molybdenum, etc.), phosphides (e.g., copper phosphide, nickel phosphide, tungsten phosphide, cobalt phosphide, molybdenum phosphide, combinations thereof, etc.), promoters (e.g., alkali metals, precious metals, bimetallics, etc.) and/or other suitable catalyst materials (e.g., for a specific reaction, combined with a specific substrate material, etc.).

The catalytic element and the electrical couplers can be connected mechanically (e.g., physically compressed together such as using a spring, pneumatic systems, hydraulic system, vacuum, motors, Belleville washer, etc.), chemically (e.g., using an adhesive such as carbon), and/or using any suitable connection mechanism or combination thereof (e.g., wetted connection, brazing, diffusion bonding, ultrasonic welding, etc.).

While typically fluid enters the reaction module after passing through a heat exchanger and/or preheater (e.g., to preheat the fluid), in some variants an additional inlet can supply a second fluid stream directly to the reaction module (e.g., along a flow direction orthogonal to the flow of fluid through the heat exchangers). In variants that include the second fluid stream, the second fluid stream typically includes hydrocarbons (e.g., short-chain hydrocarbons such as C1-C8 straight chain or branched hydrocarbons) that can undergo reformation and/or cracking within the reaction module (e.g., concurrently with other reactions such as reverse gas water shift reaction, where the second reaction can provide reagents for the first reaction, can shift an equilibrium point of the first reaction, etc.). However, other suitable reagents can be introduced in the second fluid stream (e.g., a first reagent is introduced via a first fluid stream such as $CO_2$ and a second reagent is introduced via the second fluid stream such as $H_2$). The fluid from the second fluid stream can be removed via a second outlet and/or can exit through the same outlet as the first fluid stream.

The optional preheater(s) can function to heat fluid flow to a threshold temperature (e.g., to promote the fluid entering the reaction module at the reaction temperature, to promote the fluid entering the heat exchanger at a higher temperature to increase a temperature within the heat exchanger, etc.) and/or can help improve a temperature stability within the reaction module. For instance, in some variants the inventors have observed temperature fluctuations of up to 200° C. within the reaction module, where the inclusion of a preheater can reduce these fluctuations to less than about 50° C. The preheater is preferably substantially identical to the reaction module (e.g., same shape, same dimensions, same material, same design, etc.). In these variants, the preheater can act as an additional site for reactions to occur (e.g., effectively increase the size of the reaction module). In other variants, the preheater can be substantially identical to the substrate of the reaction module (e.g., excluding catalyst material). In another variant, the preheater can have a similar structure to the reaction module substrate but with a lower porosity (e.g., thereby resulting in a greater thermal mass). However, other suitable preheater designs can be used (e.g., cross-plate heat exchanger for counter flowing fluids such as fluid between different reaction modules, solar salt storage, molten metal stored heat, nuclear heat, etc.). As a specific example, after the preheater, the fluid can be substantially at the reaction temperature. As a second specific example, after the preheater, the fluid can be at a higher temperature than the reaction temperature (e.g., to transfer excess heat to another fluid, to thermal storage material, etc.). However, after the preheater, the fluid can be at any suitable temperature. Preheaters can be particularly beneficial when the reaction module is operated with fluid mass less than a maximum fluid mass accommodatable by the thermal reactor and/or reaction module (e.g., as the heat exchanger can be less efficient or achieve lower temperatures in the inlet fluid in such conditions).

Figure 17:
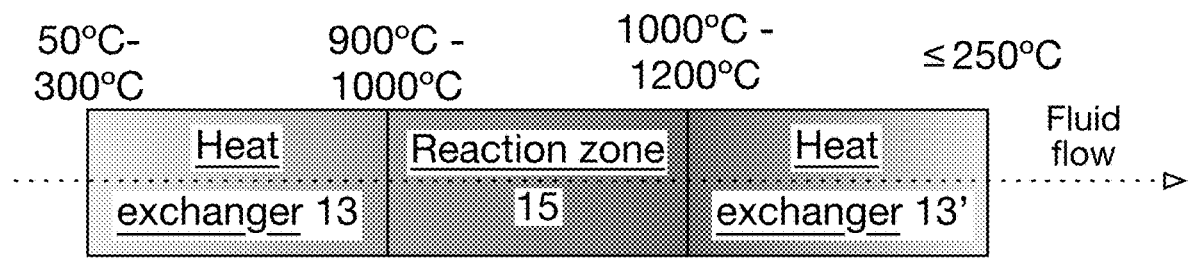
FIG. 17 is a schematic representation of an exemplary temperature gradient across an exemplary reactor system at a snapshot in time (e.g., shortly after switching fluid flow direction).

The heat exchangers 13, 13' preferably function to receive heat from (e.g., cool, reduce a temperature of, etc.) outputs of the reaction module (either directly or indirectly such as after passing through one or more preheaters) and to transfer heat to (e.g., heat, increase a temperature of, etc.) inputs to the reaction module (either directly or indirectly such as before passing through one or more preheaters). The temperature gradient across the heat exchanger can depend on the reaction to be performed within the reaction module. For instance (as shown for example in FIG. 17), for a reverse gas water shift reaction, the heat exchanger temperature gradient preferably ranges from about 200° C. (which can be beneficial for integrating with other heat exchanger technologies, manifold technologies, etc.) to about 1200° C. However, in some variants lower temperatures (e.g., 50° C., 100° C., etc. for the low temperature range; 900° C., 1000° C., 1050° C., 1100° C., etc. for the higher temperature range) and/or higher temperature (e.g., 250° C., 300° C., etc. for the low temperature end of the heat exchanger; 1250° C., 1500° C., 2000° C., 2500° C., etc. for the high temperature end of the heat exchanger) limits can be realized (e.g., for different heat storage materials, for different chemical reactions or processes, etc.).

The heat exchangers are preferably fixed matrix regenerators. However, additionally or alternatively the heat exchangers can be or include rotary regenerators, Rothemühle regenerator, a microscale regenerator (e.g., a multi-layer grating structure), double pipe heat exchanger, shell-and-tube heat exchanger, plate heat exchanger, plate and shell heat exchanger, condensers and boilers, adiabatic wheels, plate fins, finned tube, pillow plate, dynamic scraped surface heat exchanger, phase change heat exchanger, direct contact heat exchanger, microchannel heat exchanger, helical-coil heat exchanger, spiral heat exchanger, countercurrent flow, spiral or cross flow heat exchanger, distributed vapour or spiral flow heat exchanger, and/or other suitable heat exchanger(s) can be used.

In variants that use a fixed matrix regenerator, the heat exchanger volume can be divided into sub-regions or sub-chambers (as shown for example in FIG. 15A or FIG. 15B). Between sub-regions, a plate, baffle, and/or other divider can be included that can function to modify fluid transfer characteristics (e.g., improve mixing, increase turbulence, reduce fluid flow speed, increase laminarity, increase fluid residence time within the regenerator, etc.). The divider (e.g., plate, divider, etc.) can be porous, include engineered through-holes (e.g., radially-arranged through holes), meshes, fibers, and/or other suitable design that permits fluid transport therethrough. In some variants, the divider(s) can additionally or alternatively act as thermal breaks thereby facilitating the formation of a temperature gradient (e.g., slowing full thermal equilibration within the reactor system or heat exchangers thereof).

In variants that use a fixed matrix regenerator, the heat exchanger preferably includes a heat storage medium (e.g., a material that can store and dissipate heat). The heat storage medium is preferably thermally resilient to temperatures exceeding the reaction temperature (e.g., by at least 50-100° C.), chemically resilient (e.g., to attack by, reactions with, etc. chemical species in the fluid stream at or near the reaction temperature, where the chemical species can refer to one or more reactants and/or products such as carbon dioxide, carbon monoxide, hydrogen, carbon, oxygen, water, nitrogen oxides, sulfur oxides, etc.), has a high heat transfer coefficient, has a low thermal conductivity, low thermal expansion coefficient (or otherwise resilient to thermal cycling), and/or can have other suitable properties. Additionally or alternatively, the heat storage media can optionally sorb (and preferably desorb) one or more reactant and/or product, where in these variants, the heat storage media can further function to control a product and/or reactant concentration and/or purity. For example, the heat storage media can sorb the chemical species when the heat storage media is below a desorption temperature and the heat storage media can release the sorbed chemical species when the heat storage media is above the desorption temperature.

The heat storage material can have plate, granules, aggregates, agglomerates, saddle-type, irregular, monoliths, tubes, rods, pillars, cylinders, spheres, spheroids, combinations thereof, and/or other suitable shapes and/or morphology. Particles of the heat storage material can be solid, porous, fibrous, mesh, and/or can have other suitable geometry and/or density. A characteristic size or dimension (e.g., diameter, radius, height, width, length, diagonal, etc.) of particles of heat storage material can be between 100 nm and 10 mm.

Examples of preferred heat storage materials include but are not limited to: silica, fire brick, kiln brick, alumina, zirconia, ceria, yttria, ytterbia, lutetia, scandia, thoria, titania, chrome-magnesite, magnesite-chrome, alumina, magnesium oxide, calcium oxide, beryllium oxide, barium oxide, radium oxide, strontium oxide, grog, iron oxide, beryllium nitride, calcium aluminates, cerium hexaboride, cerium sulfide, chromite, chromium carbide, graphite, hafnium carbide, hafnium carbonitride, hafnium nitride, lanthanum hexaboride, molybdenum carbide, molybdenum silicide, niobium carbide, silicon carbide, tantalum carbide, titanium carbide, tungsten silicide, vanadium carbide, zircon, zirconium carbide, zirconium boride, zirconium nitride, zirconium silicate, and/or other suitable ceramic materials and/or cermets can be used (e.g., typically oxides, nitrides, carbides, borides, silicides, or combinations thereof of transition metals, rare earth metals, or combinations thereof). Additional or alternative heat storage materials (particularly but not exclusively for lower temperature regions of the heat exchanger) can include metals (e.g., transition metals, platinum group metals, noble metals, etc.), carbon-reinforced carbon, metal alloys, and/or other suitable materials. Similarly, in variants of the heat exchanger that include dividers, the dividers can be made from any material that can be used as a heat storage material (e.g., the same material used for the heat storage material or a different material that can be used as a heat storage material).

In some variants, a plurality of heat storage media can be used. Typically, in these variants, a gradient or segregation of the different heat storage media is formed (e.g., different heat storage media in different subregions or chambers of the heat exchanger, different heat storage media in different temperature regions of the heat exchanger, etc.). For example, a first heat storage media can be used in a coldest region of the heat exchanger (e.g., in a region of the heat exchanger that remains below about 500° C. during normal operation) and a second heat storage media can be used in a hotter region of the heat exchanger (e.g., in a region of the heat exchanger that exceeds about 500° C. during normal operation). In some variations of this example, the first heat storage media can further be selected to sorb one or more chemical species from the fluid (e.g., carbon dioxide). Examples of such sorbent materials include (but are not limited to): beryllium oxide, magnesium oxide, calcium oxide, strontium oxide, barium oxide, radium oxide, amines (e.g., amine impregnated solids, amine-MOFs, etc.), zeolites (e.g., porous aluminosilicate solids such as 13X, Ca-A, etc.), metal-organic frameworks (MOFs such as Mg-MOF-74, Ni-MOF-74, Co-MOF-74, HKUST-1, SIFSIX-3(Zn), $Zn(ox)(atz)_2$, etc.), silica (e.g., mesoporous silica), activated carbon, chemical-looping combustion materials (e.g., $Fe_2O_3$, $Fe_2O_3$/YSZ, NiO, NiO/$Al_2O_3$, NiO/YSZ, transition metal oxides, rare earth metal oxides, etc. where YSZ refers to yttria stabilized zirconia), and/or other suitable sorbent materials (which are typically not used for the second heat storage media due to relatively poorer thermal cycling at higher temperatures). In other variations, metal and/or alloys can be used as heat storage media in the colder regions of the heat exchanger. While this specific example uses two sub-regions, the heat exchanger can be divided into any suitable number of sub-regions (e.g., 3, 4, 5, 10, etc.) where each region can have the same or different heat storage materials (where typically the regions or sub-regions that experience temperatures greater than about 900° C. will use ceramic heat storage materials). However, the different heat storage media can be intermixed (e.g., substantially homogeneous).

Figure 16:
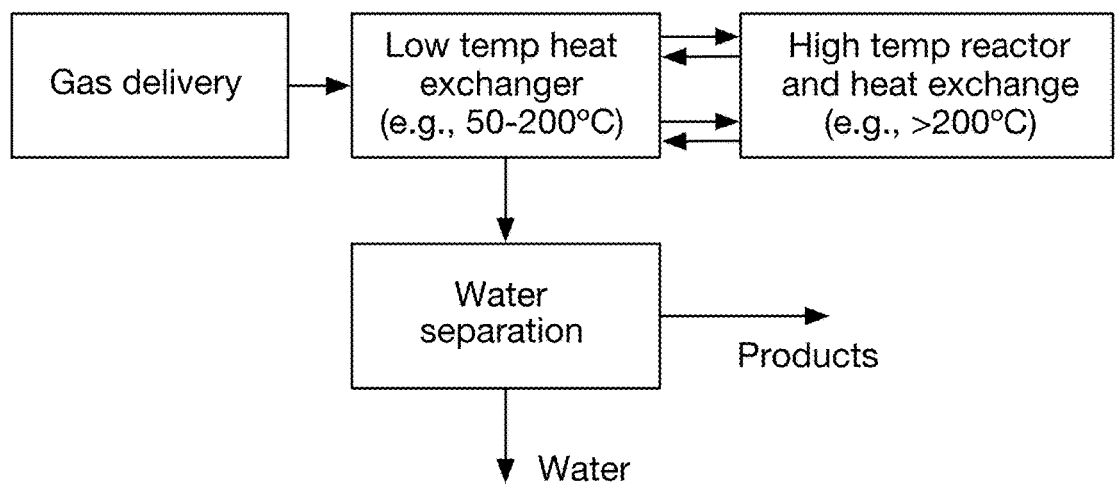
FIG. 16 is a flow chart representation of an exemplary fluid flow configuration within a reactor system.

In some variants, a plurality of heat exchangers can be used. For instance (as shown for example in FIG. 16), a low temperature heat exchanger (e.g., a recuperator, plate, plate and shell, shell-and-tube, etc.) can be used below a threshold temperature (e.g., below about 200° C., 250° C., 300° C., etc.; below a temperature where water or another component of the fluid condenses; etc.) and a high temperature heat exchanger (e.g., at temperatures between 200-1500° C., 300-1500° C., 500-2000° C., 750-1250° C., values or ranges therebetween, etc. such as a regenerator) can be used.

During normal operation, the reactor system preferably switches fluid flow direction through the reactor system so that the fluid removes heat from one heat exchanger while providing heat to the opposing heat exchanger (and where the functionality reverses when the fluid flow reverses direction). The fluid flow can be controlled by a series of valves (as shown for instance in FIG. 14, where one inlet and one outlet valve are open at a time on opposing ends of the reactor system), via a rotary mechanism, and/or in other such manner.

The fluid flow direction can be switched automatically, manually, and/or with other suitable timing. For instance, the fluid flow direction can be switched at a predetermined frequency (e.g., every 1 second, 10 seconds, 15 seconds, 30 seconds, 45 seconds, 60 seconds, 75 seconds, 90 seconds, 100 seconds, 150 seconds, 300 seconds, 600 seconds, 1000 seconds, 1500 seconds, etc.), responsive to sensor readings (e.g., a temperature of fluid in the inlet, a temperature of fluid proximal an entrance to the reaction module, a temperature of fluid at the outlet, a composition of the fluid at the outlet, a composition of the fluid at the inlet, a temperature of the fluid at the outlet of the reaction module, a temperature of the heat exchanger at one or more locations, a composition of the fluid at an outlet, a composition of the fluid proximal an outlet of the reaction module, etc.), and/or can be switched in response to any suitable data or information. When a plurality of switching mechanisms is used, the switching mechanisms (e.g., valves) can be switched contemporaneously (e.g., simultaneously), sequentially (e.g., closing an inlet to allow entrained fluid to be evacuated thereby reducing mixing of fluid streams from carryover followed by closing the outlet and then opening the opposing inlet and outlet), and/or in other suitable order.

Alternative embodiments implement the above methods and/or processing modules in non-transitory computer-readable media, storing computer-readable instructions that, when executed by a processing system, cause the processing system to perform the method(s) discussed herein. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, and/or FPGA/ASIC. However, the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the preceding system and/or method can be used with, in addition to, in lieu of, or otherwise integrated with all or a portion of the systems and/or methods disclosed in the applications mentioned above, each of which are incorporated in their entirety by this reference.

As used herein, "substantially" or other words of approximation (e.g., "about," "approximately," etc.) can be within a predetermined error threshold or tolerance of a metric, component, or other reference (e.g., within 0.001%, 0.01%, 0.1%, 1%, 5%, 10%, 20%, 30% of a reference), or be otherwise interpreted.

In the present disclosure, certain components of systems are described as being "coupled" to one another. As will be appreciated, the term "coupled" as used herein describes components that are operationally linked to one another, but does not preclude the presence of intervening components between those said to be coupled to one another. For example, valves, piping, additional heat exchange elements, separators, or any other suitable process equipment may be interposed between two components that are coupled to one another.

As a person skilled in the art will recognize from the previous detailed description and from the figures and claims, modifications and changes can be made to the preferred embodiments of the invention without departing from the scope of this invention defined in the following claims.

Illustrative Examples

Figure 1:
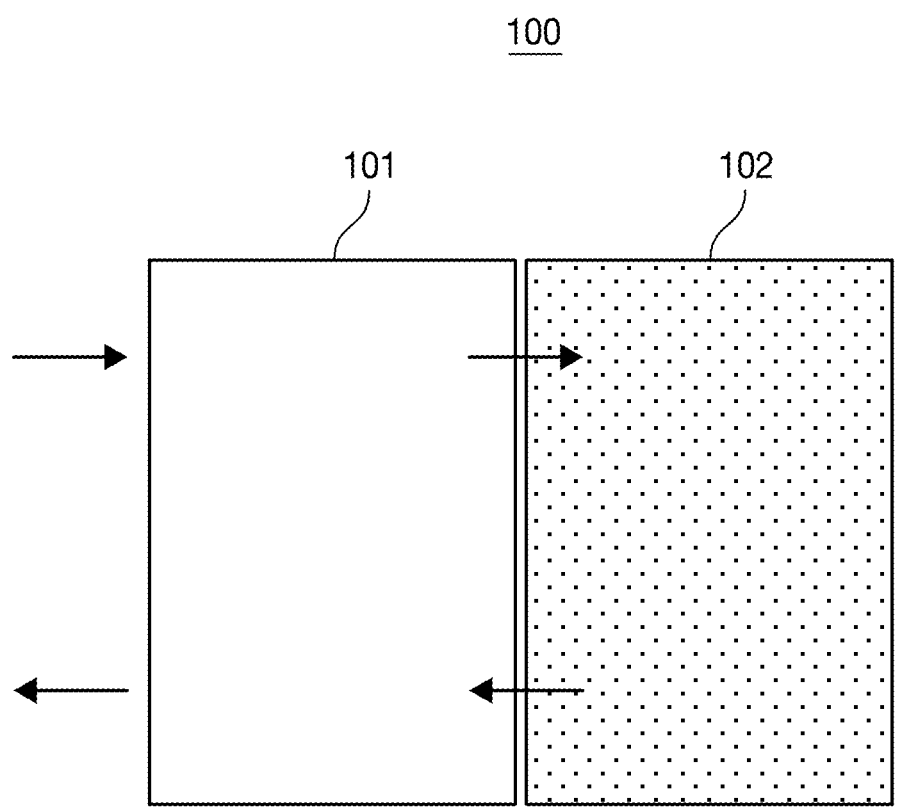
FIG. 1 is a diagram illustrating certain embodiments of a heat exchanger-reactor system.

FIG. 1 is a diagram illustrating certain embodiments of a heat exchanger-reactor system. The heat exchange system (101) may be recuperative or regenerative using any suitable heat exchanger configuration (e.g., shell and tube, plate-fin, shell-and-plate, etc.) or use an irregular geometry such as stacked conical plates or radial flow plates (not shown). The heat exchange system may be comprised of metals, ceramics, or a combination thereof. The reaction zone 102 is fully electrified with a suitable structured catalyst as described, e.g., in International Patent Pub. No. WO2022/221740; International Patent App. No. PCT/US23/35537, or U.S. Provisional Patent App. No. 63/524,468, the entire contents of each of which is fully incorporated by reference herein.

Figure 2:
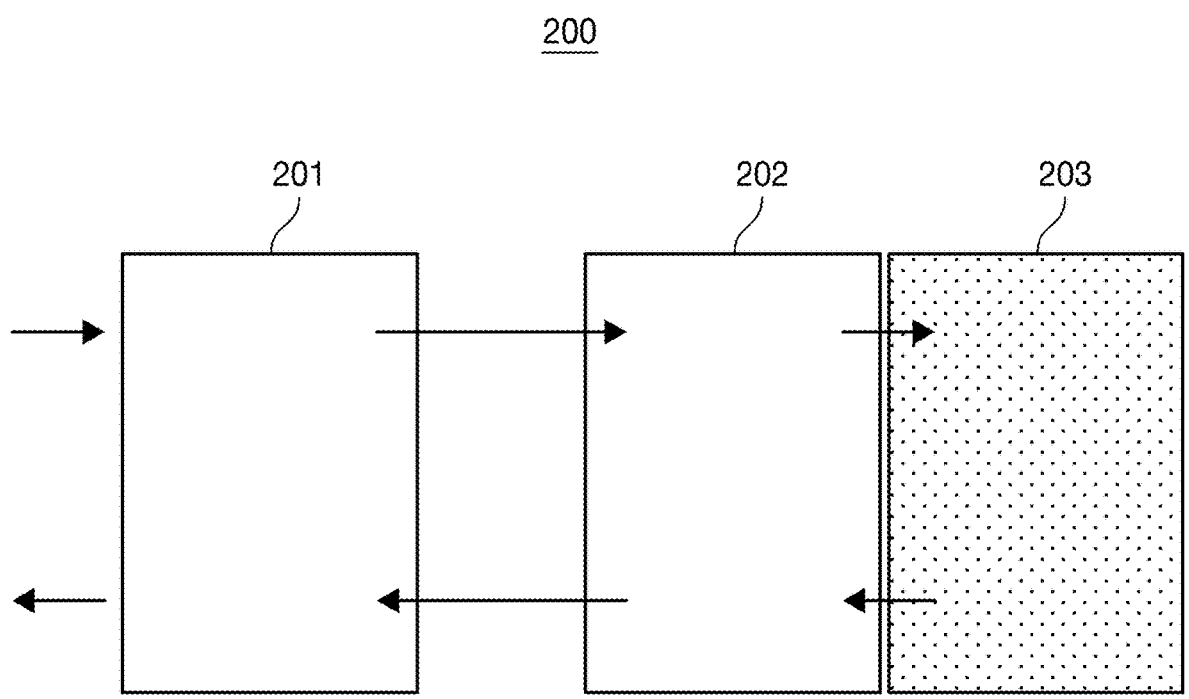
FIG. 2 is a diagram illustrating certain embodiments of a multi-staged heat exchange system of the present disclosure.

FIG. 2 is a diagram illustrating certain embodiments of a multi-staged heat exchange system of the present disclosure. In certain embodiments, the multi-staged heat exchange system includes multiple heat exchange zones/elements (201, 202), where each heat exchange element can be referred to as one stage and the multiple heat exchange elements, together, are the multiple stages. In certain embodiments, the stages are connected in series. One or more of the heat exchange zone stages can further be disposed to be coupled to or in fluidic contact with the reaction zone/catalyst zone/catalytic element (203). The multiple stage configuration can be beneficial for several reasons. First, the use of different materials can exchange heat for different temperature ranges of the recuperator. For example, ceramics may be used primarily in the high temperature region of the system (e.g., at or above 800° C.), metal components may be used in the intermediate temperature region (e.g., 250 through 800° C.), and gasketed components may be used at the lower temperatures (e.g., at or below 250° C.). Second, materials of construction can be tailored to gas phase compatibility at local conditions. For example, ceramics or coated metals may be used in the metal dusting region (e.g., 400 through 800° C.) of a recuperator that is handling synthesis gas. Third, the system can confine phase transitions to specified components within the system. For example, water condensation may be directed to take place in locations downstream of the gas feed. The gas feed may be placed in intermediate stages such that water condensation does not take place within the gas-gas heat exchange section to prevent multi-phase flow. These types of systems may be further segmented and composed of a plurality of components as shown in FIGS. 3, 4, and 5.

Figure 3:
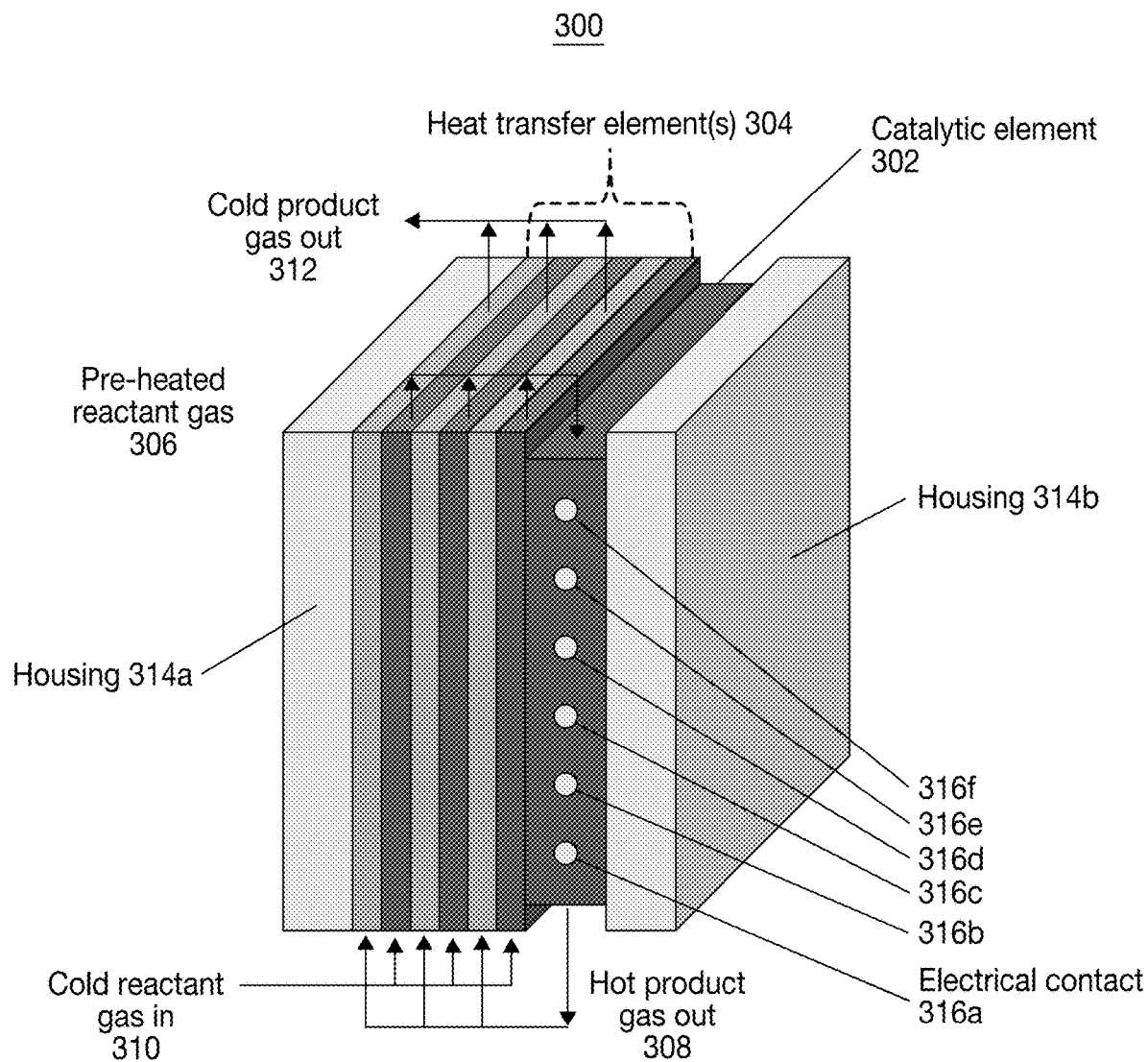
FIG. 3 is a diagram illustrating certain embodiments of plurality of heat exchange plates operating in co-current flow mode to exchange heat from the outgoing hot product gas to the incoming cold reactant gas.

FIG. 3 is a diagram illustrating certain embodiments of plurality of heat exchange plates operating in co-current flow mode or parallel flow mode to exchange heat from the outgoing hot product gas to the incoming cold reactant gas. The catalytic zone is illustrated as a single block of resistively heated material. The catalytic zone can further be referred to as a catalytic zone, catalytic region, or catalytic element. The catalytic zone may also segment into multiple zones, blocks, or elements for finer temperature control along a dimension (e.g., length, width, or height) of the catalytic bed. In certain embodiments, the catalytic zone can be part of a reaction zone.

In certain embodiments, catalytic element 302 is disposed to heat transfer elements 304. The catalytic element 302 and heat transfer element(s) 304 are disposed within housing 314a-b. In certain embodiments, the housing is a pressure housing. The catalytic element 302 is further disposed to be in contact with heated or pre-heated reactant gas 306, which causes a reaction that produces hot product gas 308.

Heat transfer element(s) 304 are disposed to be in contact with the hot product gas 308 and cold reactant gas 310. In certain embodiments, the heat transfer elements are regenerative. In certain embodiments, individual heat transfer element(s) 304 are disposed to be in contact with both hot product gas 308 and cold reactant gas 310. The hot product gas applies heat to the heat transfer element(s) 304 that is transferred to the cold reactant gas 310, resulting in heated or pre-heated reactant gas 306.

In certain embodiments, the catalytic element 302 further includes, or has affixed thereon, one or more electrical contacts 316a-f that enable the application of electricity to the catalytic element 302 for resistive heating. In certain embodiments, the catalytic element 302 can be heated electrically by application of microwaves, induction, or plasma.

Figure 4A:
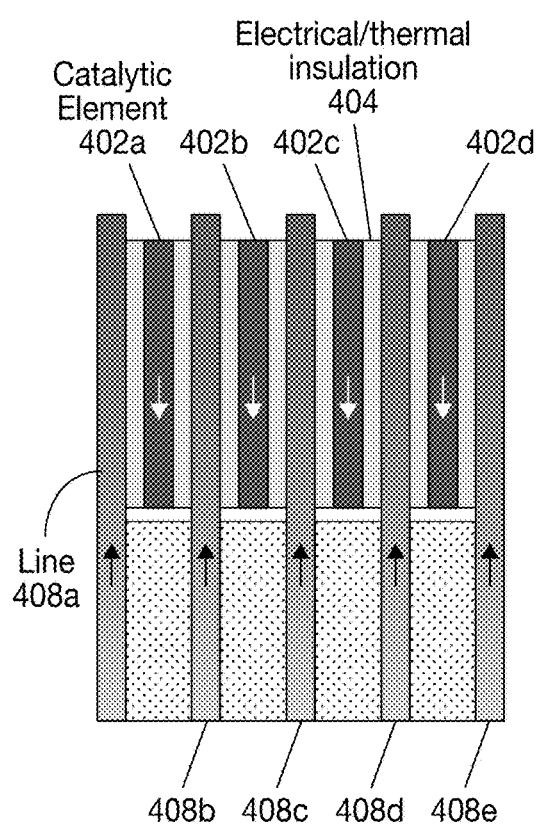
FIGS. 4A-4C are diagrams illustrating certain embodiments of a plate-fin type reactor-heat exchanger system with the catalytic elements integrated within the hot zone of the heat exchanger.
Figure 4B:
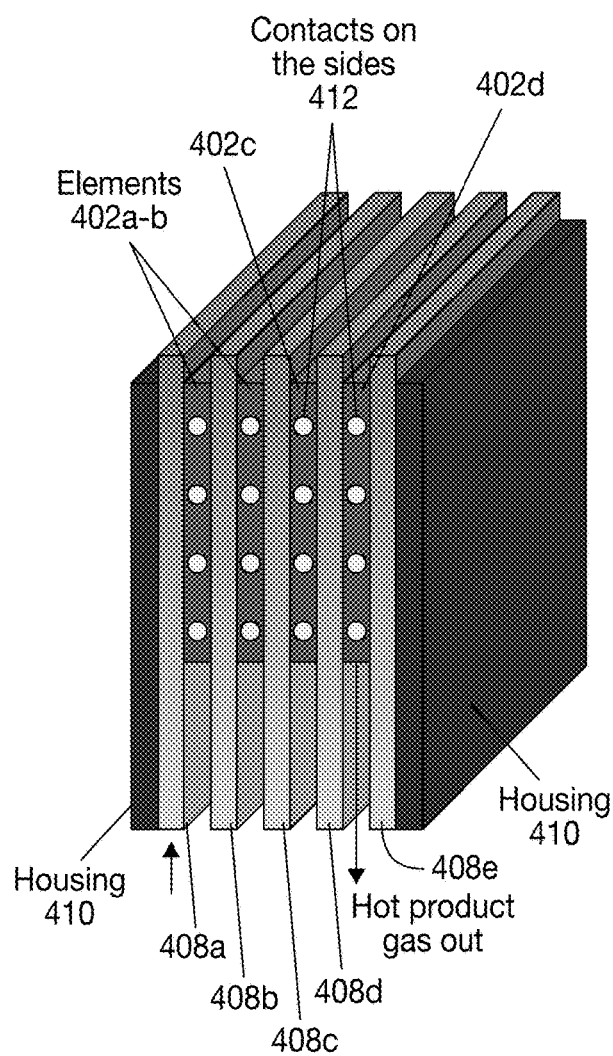
Figure 4C:
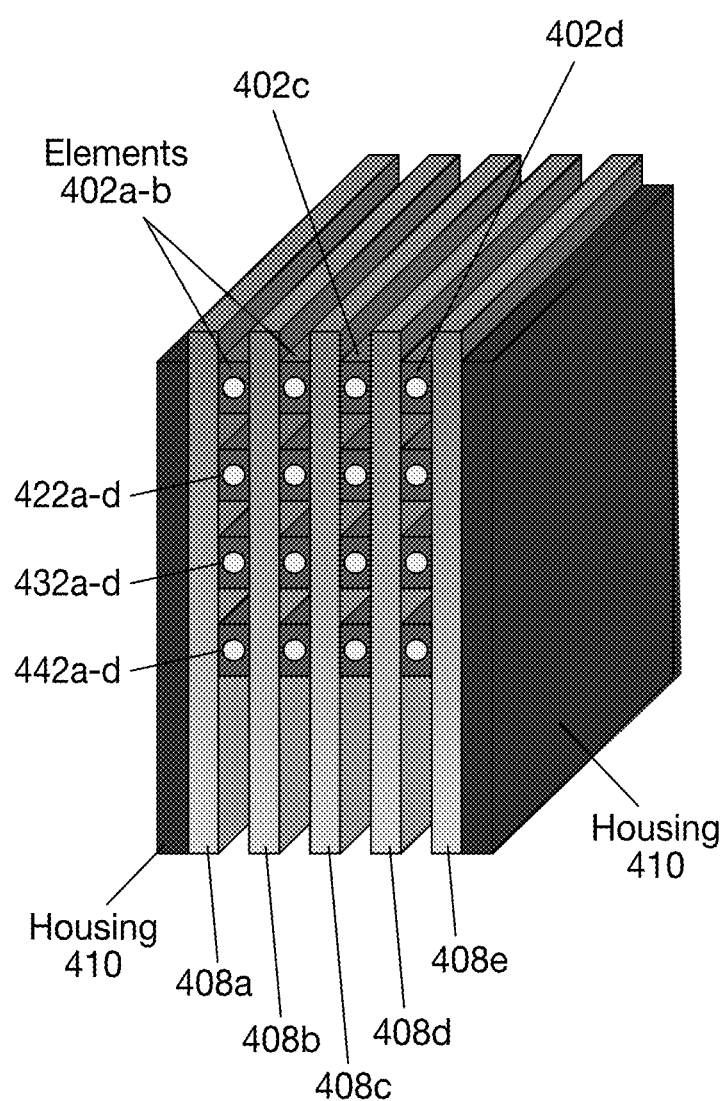
Figure 5:
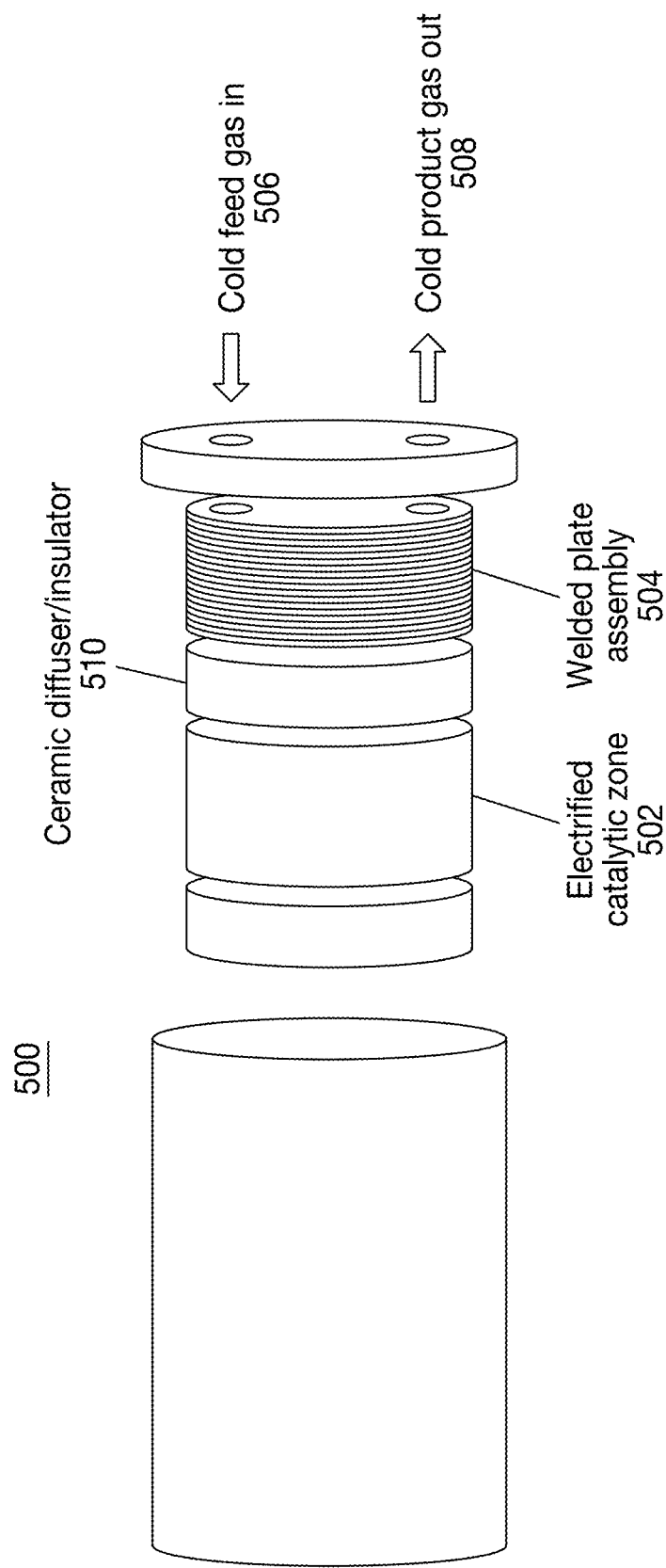
FIG. 5 is a diagram illustrating certain embodiments of a shell-and-plate design of a heat exchanger-reactor system.

FIGS. 4A-C are diagrams illustrating certain embodiments of a plate-fin type reactor-heat exchanger system with the catalytic elements integrated within a hot zone of the heat exchanger. The heat exchanger system illustrated includes multiple channels, each channel including at least one catalytic element 402a-d and at least one heat transfer insert 406. This allows for all heat to be retained within the channels and minimize heat loss to the outside.

In FIG. 4A, catalytic elements 402a-d are disposed at least partially within electrical or thermal insulation. The hot reactant gas travels through the catalytic elements 402a-d in the direction of the down arrow to the heat transfer insert 406 (e.g., fins), becoming hot product gas after traversing through the catalytic element 402a-d. The heat transfer insert 406 transfers the heat from the hot product gas to line(s) 408a-e carrying cool reactant gas in the direction of the up arrow shown. In certain embodiments, line(s) 408a-e can also be referred to as a conduit, passage, or cavity.

FIG. 4B is a diagram illustrating catalytic elements 402a-d being single pieces within each channels (e.g., an area between each line 408a-e). In certain embodiments, the catalytic elements 402a-d are referred to as a single zone, single region, or single block. In certain embodiments, catalytic element 402a-d has multiple electrical contacts 412 on at least one side.

FIG. 4C is a diagram illustrating multiple catalytic elements 402a-d, 422a-d, 432a-d, and 442a-d within each channel. For example, in the left most channel, catalytic elements 402a, 422a, 432a, and 442a are within the same channel but separated from each other by a cavity or heat transfer element. Likewise, catalytic elements in the other channels can be configured similarly. In certain embodiments, separating or segmenting the catalytic elements as illustrated by FIG. 4C provide additional level of process control.

Figure 9:
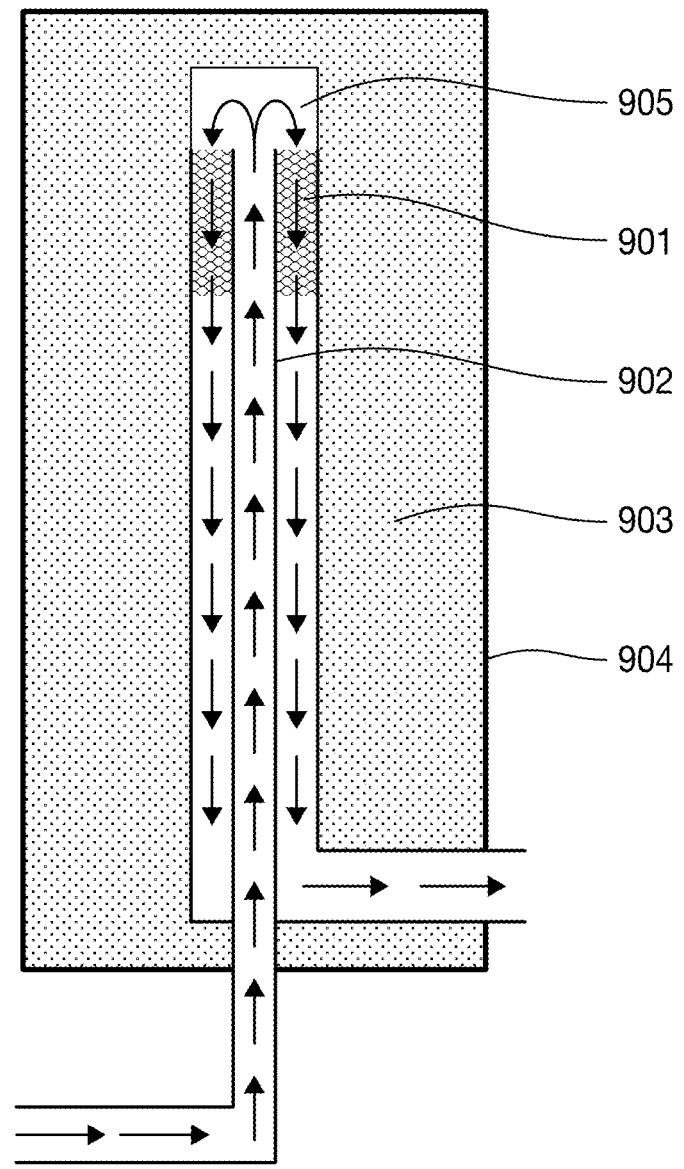
FIG. 9 is a diagram illustrating certain embodiments of a floating tube machination.

In certain embodiments, a shell-and-plate design of a heat exchanger-reactor system includes a catalyst region/zone/element inside of the shell. The shell-and-plate design of a heat exchanger-reactor system receives cool reactant gas and outputs cool product gas. The reactant gas travels within the system within a reactant gas lumen and the product gas travels within the system within a product gas lumen. The lumens are looped internally to the shell by having one end of the heat exchanger open to the inside of the shell, and the reaction zone forms a portion of the interior of the shell. Certain embodiments of this general configuration are shown in FIGS. 5 and 9. In certain embodiments, the reactant gas lumen is disposed through the interior of the heat exchanger to heat the reactant gas, through the catalytic zone to create the product gas, which is then passed to the product gas lumen in the interior of the shell and the exterior of the heat exchanger, so that the cooled product gas can be output from the heat exchanger-reactor system. In certain embodiments, the reactant gas lumen is disposed between the shell and the heat exchanger, and the product gas lumen is disposed through the catalytic zone to create the product gas and through the heat exchanger to cool the product gas.

FIG. 5 is a diagram illustrating certain embodiments of a shell-and-plate design of a heat exchanger-reactor system. In certain embodiments, the heat exchange is performed via a plate assembly that allows for gas-gas heat exchange through the heat- transfer elements of the welded plate assembly 504 before the incoming cold feed gas 506 reaches the electrified catalytic zone 502. The system may be configured to have hot gas (not shown) on either the shell side or the plate side. Furthermore, in certain embodiments, the plate assemblies may be segmented into multiple stages composed of different materials, as described above. In certain embodiments, a ceramic diffuser or insulator 510 can thermally insulate the welded plate assembly from the electrified catalytic zone. The insulator 510 can further insulate other stages or components (e.g., insulate multiple sides of the electrified catalytic zone 502.

FIG. 9 is a diagram illustrating certain embodiments of a floating tube machination. With reference to FIG. 9, a recuperating heat exchange portion of the system is comprised of segments of floating tubes (902) un-bound at a hot end in a traditional tube sheet. An electrically-heated catalyst (901) at the hot end allows for thermal expansion of the tube materials of construction to grow into a cavity or empty space (905) surrounded by insulation (903). The tube (902) materials can be composites manufactured by joining varying alloys of metal and can be brazed ceramic tubes in the hottest portions. The entire assembly is contained in a pressure vessel or pressure housing (904) alleviating the high temperature tubes from the stress of pressure containment at temperature. In certain embodiments, vertical orientation allows condensate of outlet components such as water in reverse water gas shift to drain from the assembly using gravity.

Figure 6:
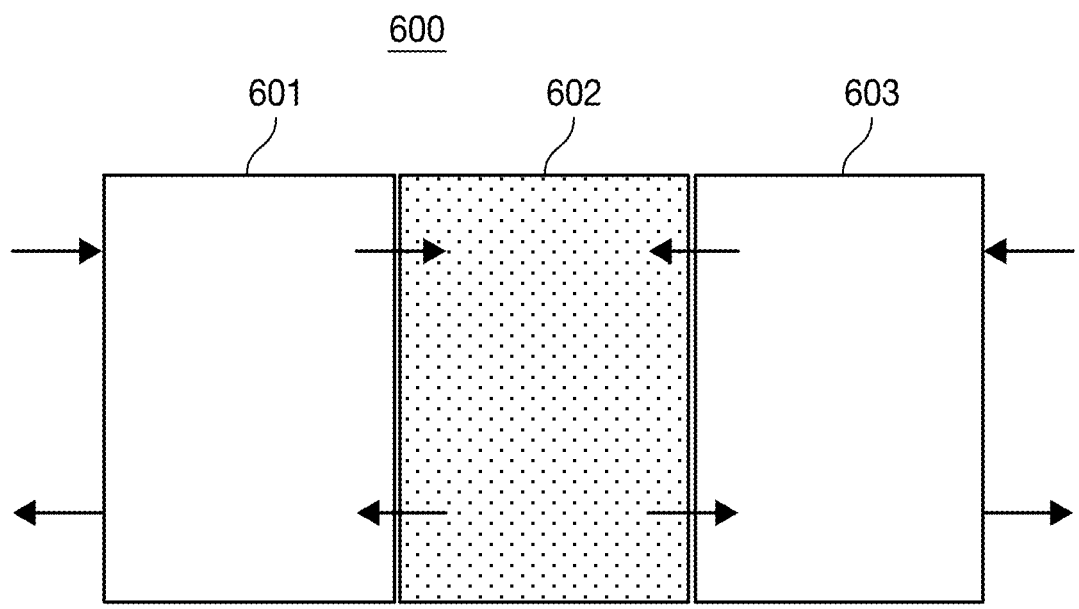
FIG. 6 is a diagram illustrating certain embodiments of the reactor system structured as a system with regenerative beds for heat exchange.

FIG. 6 is a diagram illustrating certain embodiments of the reactor system structured as a system with regenerative beds for heat exchange. In this configuration a solid heat exchange media is placed in the thermal storage beds (601 and 603) and a valving system is used to alternate the flow direction through the system on periodic basis. The timing of the valve switching is determined by the mass and heat capacity of the regenerators, the gas heat exchange characteristics of the packing and the gas flow. A catalytic element, region, or zone 602 is electrically heated to maintain a high degree of operational control over the catalytic conditions. In steady-state operation, a gas steam exiting the catalytic zone 602 is passed over a solid material in regenerator 601 or 603, depending on the direction of flow. The gas transfers heat to the solid, thereby cooling the gas down to the desired outlet temperature. When the flow is then reversed, the incoming cool gas is passed over the heated solid material, which transfers heat to the incoming gas, thereby raising the temperature close to the reaction temperature. Additional heat, as necessary, is provided by the electrified catalytic zone 602. The solid heat transfer packing can be any of: packed spheres, packed irregular shapes (e.g., saddles), monoliths, stacked structured ceramic sheets, stacked ceramic woven screens, 3D printed ceramic components (e.g., gyroids), or any combination of the above. The packing materials can be comprised of metals, ceramics, cermets, and any combination thereof. The packing may be structured in a particular orientation that is designed to control the contact time of the gas with the heat exchange media. The packing may also be formulated to match the coefficient of thermal expansion of other components in the system (e.g., the system insulation).

Figure 7:
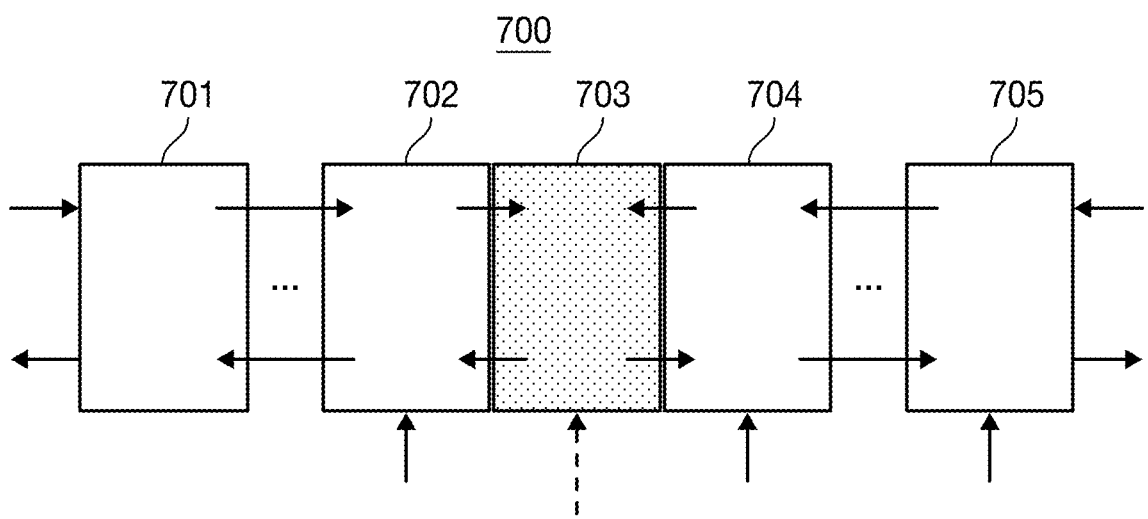
FIG. 7 is a diagram illustrating certain embodiments of multi-stage system of the present disclosure.

FIG. 7 is a diagram illustrating certain embodiments of multi-stage system of the present disclosure. In certain embodiments, a stage of the system can include a regenerator. In certain embodiments of the multi-stage system, the integrated heat recovery allows for multiple temperature zones, which may be used to conduct additional operations such as catalytic processing and product separations. Furthermore, secondary inlets to each of the stages may be used to control the gas composition within each stage of the heat exchange system. In certain embodiments, an application is the incorporation of a $CO_2$ sorbent material in a reverse watergas shift reactor system ($CO_2+H_2 \to CO+H_2O$), especially in which the syngas product gas is used for downstream chemical synthesis that benefits from low inlet $CO_2$ content, such as Fischer-Tropsch synthesis or methanol synthesis. In this application, it is desirable to minimize the concentration of $CO_2$ at the outlet. In such a system, a high-, medium-, or low-temperature sorbent for selective removal of $CO_2$ may be incorporated into one of the temperature stages of the system having a high-temperature sorbent of, e.g., 500-800 C, a medium-temperature sorbent of e.g., 300-500 C and a low-temperature sorbent of e.g., below 300 C. In certain embodiments, the sorbent may be integrated into the solid regenerator material or even be the same material. In certain embodiments, the sorbent may be integrated such that the sorbtion-desorption cycles are carried out only with natural changes in the reactor conditions, such as variations in the gas partial pressures or temperatures. One such embodiment is a sorbent that is integrated into each of the regenerator beds that can, in one direction, selectively adsorb a species that has relatively high partial pressure in the outlet stream, such as $CO_2$ or water. In the other direction, only a sweep gas stream that does not include that species is fed to reduce the effective partial pressure of the species and encourage the desorption into the inlet stream. For example, a pure $H_2$ stream can be used for RWGS that encourages desorption of $CO_2$ into the inlet stream and an effective recycle of that $CO_2$ from effluent to inlet without any change to total pressure of the system. In another case, a similar concept might be used for reforming of methane with methane as the sweep gas. Another such example might use a similar concept for water removal. The $CO_2$ removal and release process may be physical (physisorption) or chemical and may be driven by temperature or partial pressure changes. In a chemically-mediated configuration, $CaO$ may be used to remove $CO_2$ from the gas stream by forming $CaCO_3$ at high $CO_2$ partial pressures at the outlet of the reaction zone. When the flow is reversed, pure pre-heated hydrogen (pre-heated by any number of heat exchange steps it has passed through) is fed to the sorbent section. Due to the low patrial pressure of $CO_2$ at this temperature under this condition, the $CaCO_3$ is decomposed back to $CaO$ and $CO_2$ and fed to the reaction zone for conversion to $CO$. Additional $CO_2$ may be added, as necessary downstream of the sorbent bed. It is furthermore possible to add electric heating to the regenerator section for use in system heat-up only bringing the sections 701 and 703 up to operating temperature prior to system operation. When used with waste $CO_2$ stream processes such as coke-iron reduction in steel making and calcination in concrete production, the high temperature $CO_2$ stream mixed with the high volume of $H_2$ gas reduces to overall mass requirement of the regenerator.

Figure 8:
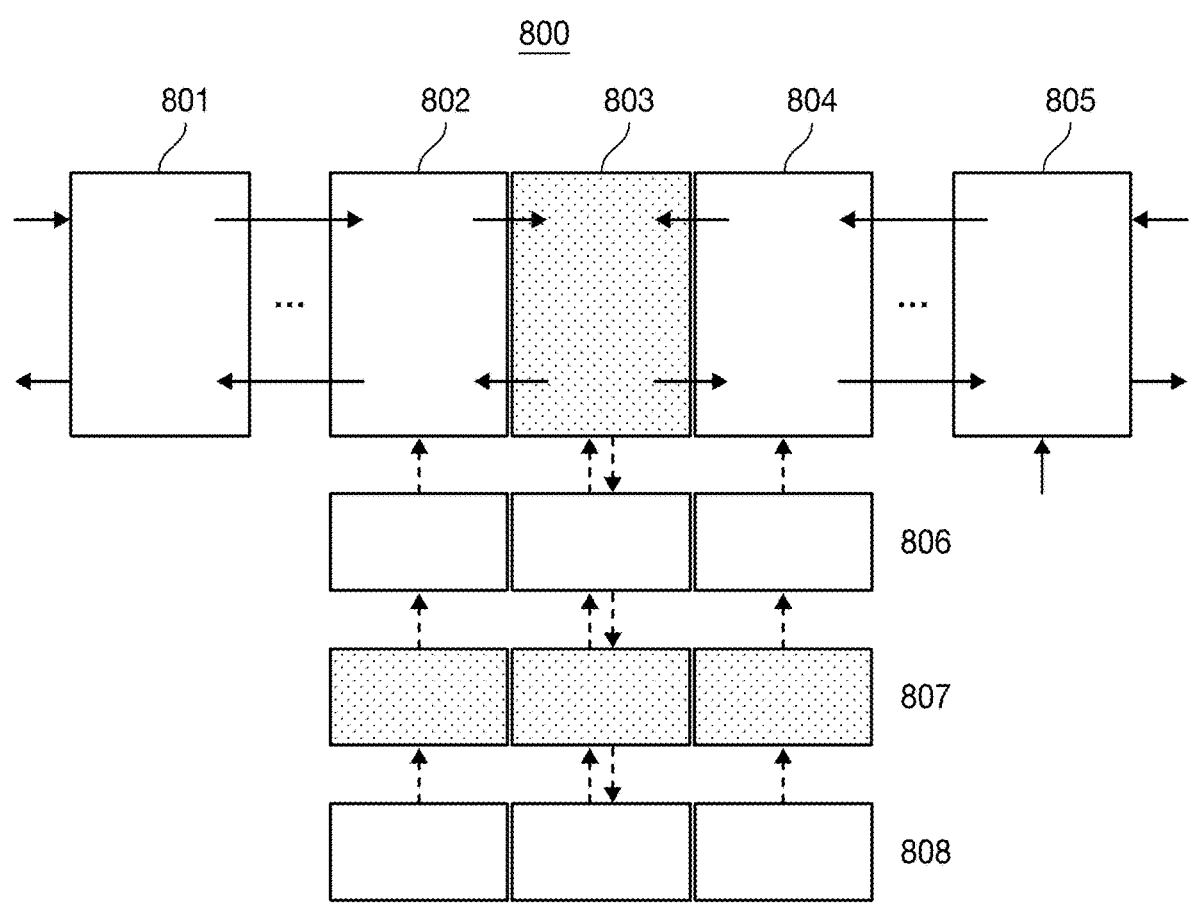
FIG. 8 is a diagram illustrating certain embodiments of an electrified or non-electrified pre-reforming catalytic section with multi-staged heat exchange and flow distribution components.

FIG. 8 is a diagram illustrating certain embodiments of an electrified or non-electrified pre-reforming catalytic section with multi-staged heat exchange and flow distribution components. Heat exchange may be performed in a unit (808) prior to the catalytic pre-reforming stage (807). Because the pre-reforming may take place at a temperature lower than the primary electrified reforming system (803), additional heat exchange may be desired (806). The inlet of the pre-reformed gas is disposed at the catalytic zone 803 or at any other heat exchange stage, as illustrated by FIG. 8.

Figure 10:
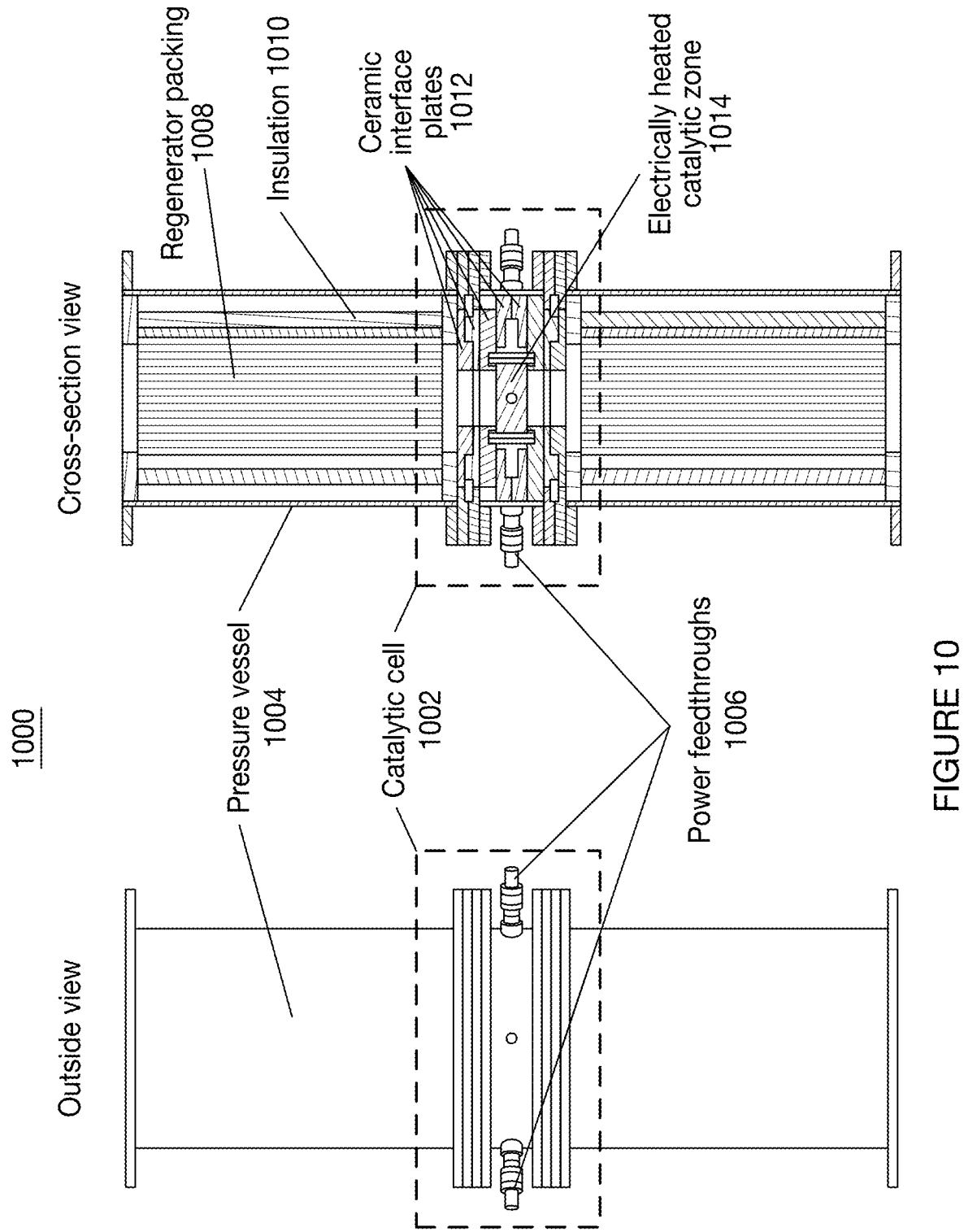
FIG. 10 is a diagram illustrating some embodiments of the reactor system disclosed herein.

FIG. 10 is a diagram illustrating some embodiments of a reactor system 1000. FIG. 10 illustrates the reactor system with an outside view (left) and a cross-sectional view (right). Thus, in certain embodiments, an electrified (e.g., electrically heated) catalytic cell 1002 includes one or more of the following: a. catalyst substrate or resistive heater 1010 (e.g., a silicon carbide substrate foam), b. a catalytic coating (not shown) deposited on the catalyst substrate, c. electrical couplers (e.g., highly conductive silicon carbide) attached to the foam, d. electrical conductors routing power to the catalytic cell 1014 via the electrical couplers, e. power feedthroughs 1006 that seal conductors to the reactor wall in a pressure tolerant manner, f. thermal insulation 1010 in the form of ceramic components that can be used to fluidically seal with and across the catalytic zone 1014 and regenerator zones 1008, g. a regenerator packing 1008 that is sized to preheat the incoming gas as close to the reaction zone temperature as possible (e.g., this packing may be any of ceramic spheres, irregular shapes (e.g., saddles), monoliths, etc.), and h. a pressure housing 1004 enabling the reactor system to be operated at elevated pressures (e.g., up to 10 bar, up to 50 bar, up to 100 bar, most preferably up to 300 bar).

Figure 11:
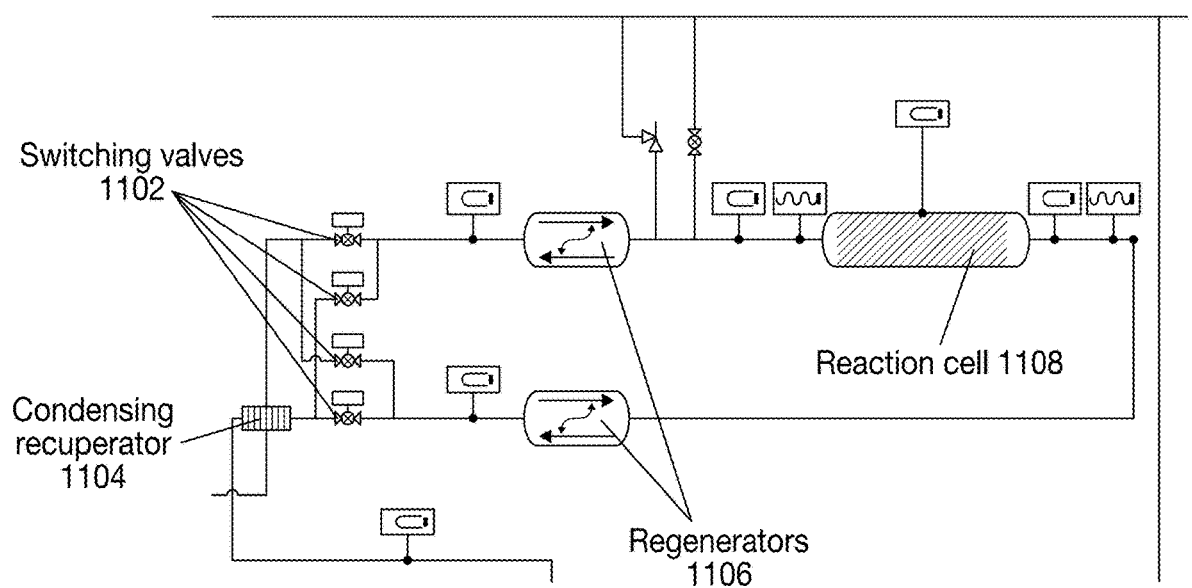
FIG. 11 is a schematic diagram illustrating some example embodiments of the present disclosure.
Figure 12:
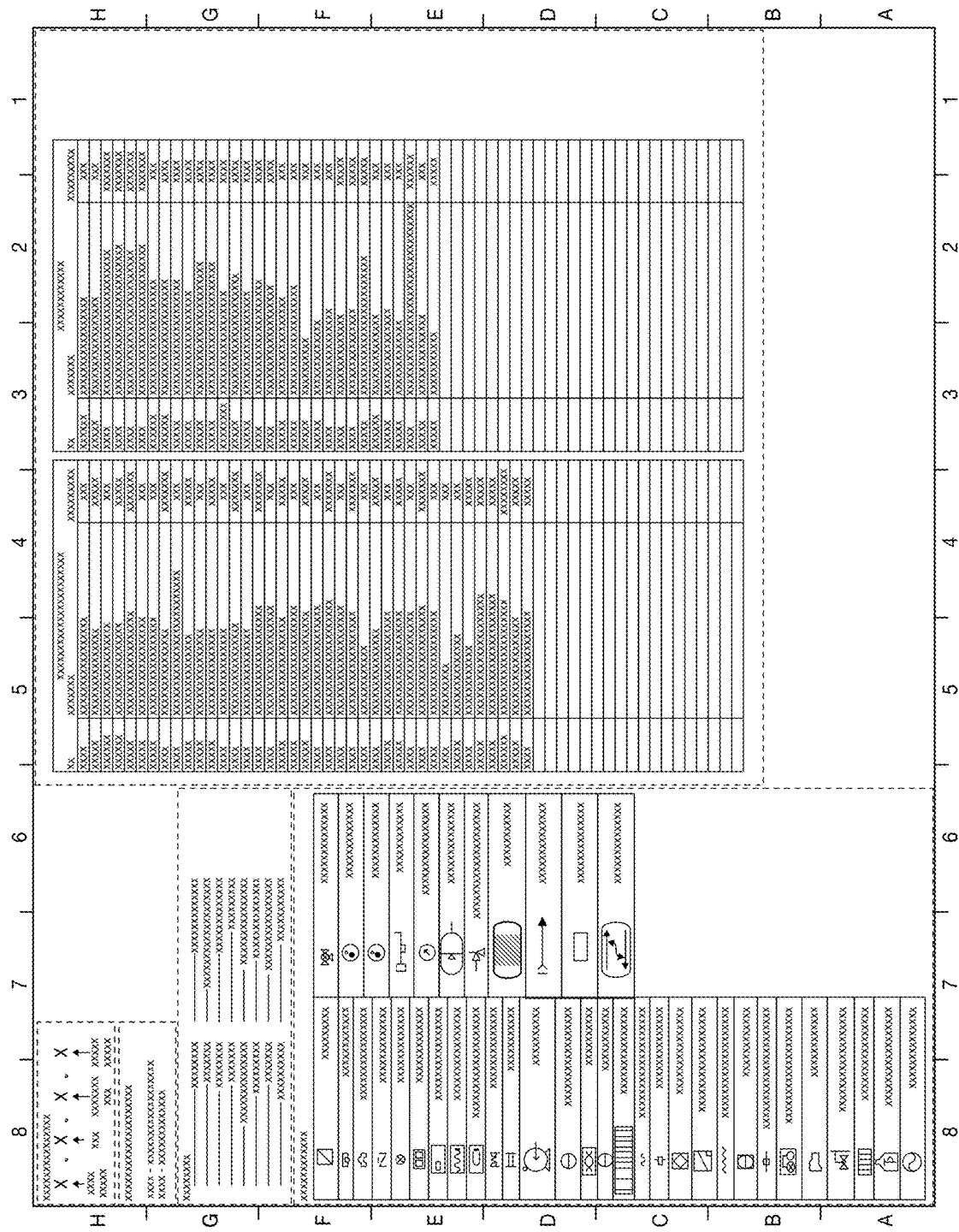
FIG. 12 is a legend for FIG. 11.

FIG. 11 is a schematic diagram illustrating some example embodiments of a reactor system 1100. FIG. 12 is a legend of FIG. 11. An outlet of the reactor 1108 is routed to a valving system (e.g., switching valves 1102) that allows the incoming gas to alternate the direction of flow through the regenerator-reactor system in a periodic manner. A condensing recuperator 1104 is placed outside of the valving system so that any water produced in the reactor 1108 (e.g., via reverse water-gas shift reaction) is not condensed within the reactor regenerator assembly. By sizing the regenerators 1106 to remove heat up to the boiling point of water at the operating pressure, the condensing recuperator 1104 may be a low-temperature and low cost heat exchanger (e.g., plate-and-frame) system.

Figure 13A:
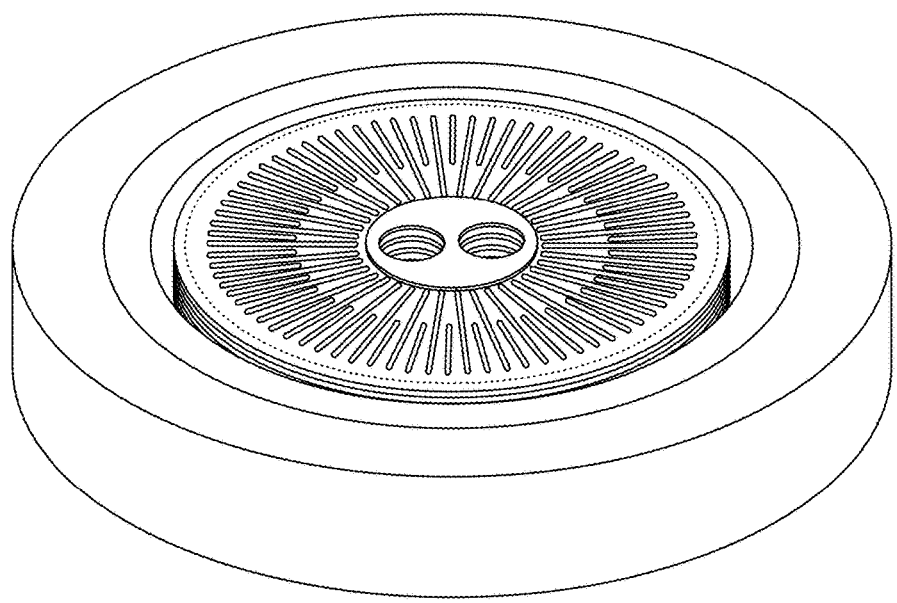
FIGS. 13A-13B are diagrams of some embodiments a round flat plate heat exchanger of the present disclosure.
Figure 13B:
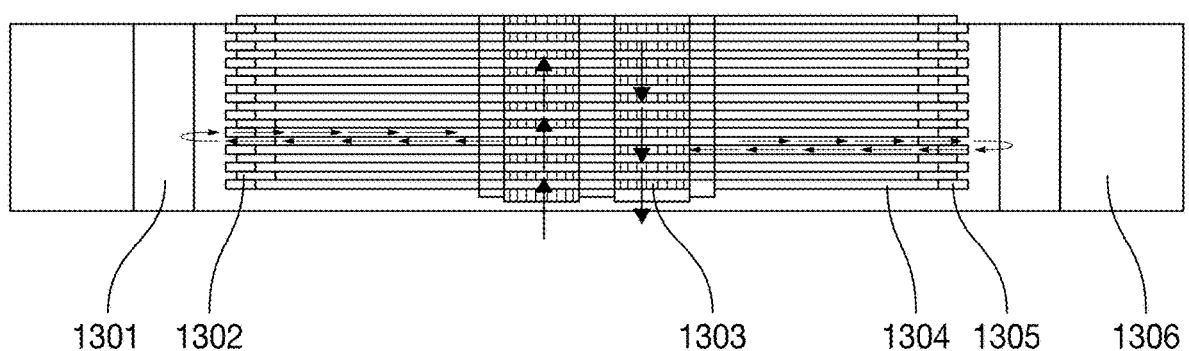

FIGS. 13A-B are diagrams of some embodiments a round flat plate heat exchanger of the present disclosure. FIG. 13A illustrates the round flat plate heat exchanger in an isometric view. FIG. 13B illustrates the round flat plate heat exchanger in a cross-sectional view. With reference to the embodiments illustrated by FIG. 13B, the round flat plate heat exchanger design uses metallic plates 1304 with a gas manifold in the center. The recuperator heat exchanger is open at the outer edges to a larger pressure vessel that is internally insulated with layers of insulation 1301, 1306. The internally manifolded separator plates 1303 are made from a dielectric material and are sealed to the metallic heat exchanger plates using o-rings and compression, or through brazing. Electrified catalyst 1305 that is disposed between the heat exchanger plates and an edge shorting bar 1302 can act as a preheater or simply pass electric current to the catalyst. The top and bottom upmost plates on the assembly are connected to the electrical power supply to conduct electricity through the stack of heat exchanger plates. In some embodiments, the round flat plate heat exchanger uses plates that are about (e.g., ±10%, ±15%, ±20%) 1 m in diameter, and if stacked to a height of about (e.g., ±10%, ±15%, ±20%) seven meters could throughput enough gas for about (e.g., ±10%, ±15%, ±20%) a 500 kilogram an hour production system.

A numbered list of specific examples of the technology described herein are provided below. A person of skill in the art will recognize that the scope of the technology is not limited to and/or by these specific examples.

Specific example 1. An electrified reactor module comprising: a first heat exchange zone comprising a first heat exchanger; and a first reaction zone comprising a first reaction volume (e.g., lumen, cavity, etc.) and a first electrically-heated catalytic element in contact with the first reaction volume, wherein the first reaction volume is coupled to the first heat exchanger.

Specific example 2. The electrified reactor module of Specific example 1, wherein the first heat exchanger is a recuperator comprising a reactant gas volume (e.g., lumen, cavity, etc.), a product gas volume (e.g., lumen, cavity, etc.), and a heat exchange element disposed between the reactant gas volume and the product gas volume; and further wherein the reactant gas volume is coupled to the first reaction volume and the first reaction volume is coupled to the product gas volume.

Specific example 3. The electrified reactor module of any of Specific examples 1-2, wherein the first heat exchanger is a regenerator comprising a heat exchange gas lumen and a heat storage medium disposed within the heat exchange gas volume; and further wherein the heat exchange gas volume is coupled to the first reaction volume.

Specific example 4. The electrified reactor module of any one of Specific examples 1-3, comprising: a first heat exchange zone comprising a first regenerator; a second heat exchange zone comprising a second regenerator; a first reaction zone comprising a first reaction volume and a first electrically-heated catalytic element in contact with the first reaction volume; a reactant gas inlet; a product gas outlet; and a valving system coupled to the first regenerator, the second regenerator, the first reaction volume, the reactant gas inlet, and the product gas outlet.

Specific example 5. The electrified reactor module of Specific example 4, wherein the valve is configured to permit alternation of gas flow between the first and second regenerators in a periodic manner.

Specific example 6. The electrified reactor module of Specific example 4 or 5, further comprising a third heat exchange zone comprising a recuperator comprising: a reactant gas volume coupled to the reactant gas inlet; and a product gas volume coupled to the product gas inlet.

Specific example 7. The electrified reactor module of any of Specific examples 1-6, further comprising: a second heat exchange zone comprising a second heat exchanger; wherein the first heat exchanger is coupled to the second heat exchanger and the second heat exchanger is coupled to the first reaction volume.

Specific example 8. The electrified reactor module of any of Specific examples 1-7, wherein the first heat exchanger and second heat exchanger are made of different materials, the different materials optimized for transferring heat from different temperature ranges.

Specific example 9. The electrified reactor module of any of Specific examples 1-8, further comprising: a second reaction zone comprising a second reaction volume and a second electrically-heated catalytic element in contact with the second reaction volume; wherein the second reaction volume is coupled to the first reaction volume.

Specific example 10. The electrified reactor module of any of Specific examples 1-9, wherein: the first electrically-heated catalytic element is disposed within the first reaction lumen; or the first electrically-heated catalytic element forms a part of a surface of the first reaction lumen.

Specific example 11. The electrified reactor module of any of Specific examples 1-10 wherein the first electrically-heated catalytic element is configured to be heated by resistance, induction, microwaves, or plasma.

Specific example 12. The electrified reactor module of any of Specific examples 1-11 wherein the first reaction zone comprises a first plurality of electrically-heated catalytic elements.

Specific example 13. The electrified reactor module of any of Specific examples 1-12, wherein a surface of the first reaction volume is adjacent to a surface of the first heat exchanger, and wherein a heat exchange element is disposed therebetween.

Specific example 14. The electrified reactor module of any of Specific examples 1-13, wherein: the first heat exchange zone comprises a plurality of heat exchange plates that at least partially define the reactant gas volume and the product gas volume such that they are in a co-current flow relationship, a counterflow relationship, or a crossflow relationship.

Specific example 15. The electrified reactor module of any of Specific examples 1-14, further comprising a plurality of electrical connections to the electrically-heated catalytic elements.

Specific example 16. The electrified reactor module of any of Specific examples 1-15, further comprising: a shell disposed around the first heat exchange zone and the first reaction zone, wherein the shell forms a portion of a wall of the first reaction volume; and further wherein the shell comprises a reactant gas inlet coupled to the reactant gas volume and a product gas outlet coupled to the product gas volume.

Specific example 17. The electrified reactor module of Specific example 16, wherein the reactant gas volume is at least partially bounded by (a) the shell and (b) the heat exchange element; and the product gas volume is in an interior of the heat exchange element.

Specific example 18. The electrified reactor module of Specific example 16, wherein the product gas volume is at least partially bounded by (a) the shell and (b) the heat exchange element; and the reactant gas volume is in an interior of the heat exchange element.

Specific example 19. The electrified reactor module of any of Specific examples 16-18, wherein the heat exchange element comprises a welded plate assembly.

Specific example 20. The electrified reactor module of any of Specific examples 16-18 wherein the heat exchange element comprises a floating tube.

Specific example 21. The electrified reactor module of any of Specific examples 16-20, wherein the first heat exchange zone allows for gas-to-gas heat exchange before the reactant gas reaches the first reaction zone.

Specific example 22. The electrified reactor module of any of Specific examples 16-20, wherein the first heat exchange zone includes a plurality of stages, e.g. wherein each stage comprises a respective heat exchanger formed from a different heat exchange material.

Specific example 23. The electrified reactor module of any one of Specific examples 1-22, wherein the first product gas volume or first reaction gas volume are formed from at least one material selected from a composite of metal alloys, a cermet, and a brazed ceramic tube.

Specific example 24. The electrified reactor module of any of Specific examples 1-23, further comprising: at least one insulation element disposed around the at least one electrically-heated catalytic element.

Specific example 25. The electrified reactor module of any of Specific examples 1-24, further comprising: a housing surrounding the first heat exchange zone and the first reaction zone.

Specific example 26. The electrified reactor module of any of Specific examples 1-25, wherein the heat exchanger filters the product gas to provide an intermediary gas, the intermediary gas being released into the reaction zone upon flow being reversed.

Specific example 27. A method of conducting a chemical reaction, the method comprising: supplying a reactant mixture to the system of any one of Specific examples 1-26; heating the first electrically-heated catalytic element; and obtaining a product gas mixture.

Specific example 28. A system comprising: a first heat exchange region; a reaction module comprising a substrate with catalytic material deposited on the substrate, wherein the substrate is in electrical communication with an electrode pair, wherein the substrate is operable to be heated via joule heating when an electrical current is passed between the electrode pair; and a second heat exchange region opposing the first heat exchange region across the reaction module, wherein the first heat exchange region, the reaction module, and the second heat exchange region are in fluid communication.

Specific example 29. The system of specific example 28, further comprising a set of valves, wherein the set of valves are operable to switch a fluid flow, wherein in a first configuration of the set of valves the fluid flows from the first heat exchange region to the second heat exchange region through the reaction module and wherein in a second configuration of the set of valves the fluid flows from the second heat exchange region to the first heat exchange region through the reaction module.

Specific example 30. The system of specific example 29, wherein the set of valves switch between the first configuration and the second configuration at a predetermined frequency.

Specific example 31. The system of specific example 29, wherein the set of valves switch between the first configuration and the second configuration based on a temperature of at least one of the first heat exchange region or the second heat exchange region.

Specific example 32. The system of any of specific examples 28-31, wherein the reaction module is further configured to receive a second fluid, wherein the second fluid does not pass through the first heat exchange region or the second heat exchange region before entering the reaction module.

Specific example 33. The system of any of specific examples 28-32, wherein the substrate comprises a refractory material (e.g., ceramic) foam.

Specific example 34. The system of any of specific examples 28-33, wherein the system is symmetric about the reaction module.

Specific example 35. The system of any of specific examples 28-34, wherein the first heat exchange region and the second heat exchange region are each filled with a heat storage medium.

Specific example 36. The system of specific example 35, wherein the heat storage medium is alumina.

Specific example 37. The system of any of specific examples 28-35, wherein the first heat exchange region and the second heat exchange region are each divided into subregions using baffle plates (e.g., ceramic baffle plates with engineered through-holes).

Specific example 38. The system of any of specific examples 28-37, further comprising a first preheater between the first heat exchange region and the reaction module and a second preheater between the second heat exchange region and the reaction module.

Specific example 39. The system of specific example 38, wherein the first preheater and the second preheater each comprise a preheater substrate in electrical communication with a preheater electrode pair.

Specific example 40. The system of specific example 39, wherein the preheater substrate is substantially the same as the substrate of the reaction module.

Specific example 41. A method comprising: receiving a fluid comprising an inlet mixture of hydrogen and carbon dioxide; preheating the inlet mixture by passing the inlet mixture through a first heat exchange region comprising heat transfer media at a temperature between 50° C. and 900° C., wherein the inlet mixture temperature increases while the heat transfer media temperature decreases; within a reaction module, reacting the hydrogen and the carbon dioxide to form a reaction mixture that comprises carbon monoxide and water as well as residual species from the inlet mixture; wherein the reaction module is electrically heated to a temperature between 1000° C. and 1500° C.; wherein the reaction module comprises a substrate with catalyst material deposited on the substrate; and cooling the reaction mixture within a second heat exchange region comprising heat transfer media, wherein the reaction mixture heats the heat transfer media in the second heat exchange region.

Specific example 42. The method of specific example 41, further comprising after cooling the reaction mixture, removing water from the reaction mixture to form syn gas.

Specific example 43. The method of specific example 41 or 42, wherein the heat transfer media for the first heat exchange region and the second heat exchange region comprise alumina.

Specific example 44. The method of any of specific examples 41-43, wherein at a predetermined frequency the fluid flow direction is reversed.

Specific example 45. The method of any of specific examples 41-44, further comprising a second preheating step after preheating the inlet mixture, wherein during the second preheating step the inlet mixture is passed over a preheating substrate that is heated using Joule heating to a temperature between 900° C. and 1200° C.

Specific example 46. The method of specific example 45, wherein at least one of the preheating substrate and the substrate of the reaction module comprises a refractory material (e.g., ceramic, cermet) foam.

Specific example 47. The method of any of specific examples 41-46, wherein a second fluid is introduced directly at the reaction module, wherein the second fluid comprises short-chain hydrocarbons comprising at most 8 (e.g., 1, 2, 3, 4, 5, 6, 7, 8, or combinations or sub combinations thereof) carbon atoms.

We claim:

1. A system comprising:
   a first heat exchange region;
   a reaction module comprising a substrate with catalytic material deposited on the substrate, wherein the substrate is in electrical communication with an electrode pair, wherein the substrate is operable to be heated via joule heating when an electrical current is passed between the electrode pair;
   a second heat exchange region opposing the first heat exchange region across the reaction module, wherein the first heat exchange region, the reaction module, and the second heat exchange region are in fluid communication; and
   a set of valves, wherein the set of valves are operable to switch a fluid flow, wherein in a first configuration of the set of valves the fluid flows from the first heat exchange region to the second heat exchange region through the reaction module and wherein in a second configuration of the set of valves the fluid flows from the second heat exchange region to the first heat exchange region through the reaction module.

2. The system of claim 1, wherein the set of valves switch between the first configuration and the second configuration at a predetermined frequency.

3. The system of claim 1, wherein the set of valves switch between the first configuration and the second configuration based on a temperature of at least one of the first heat exchange region or the second heat exchange region.

4. The system of claim 1, wherein the reaction module is further configured to receive a second fluid, wherein the second fluid does not pass through the first heat exchange region or the second heat exchange region before entering the reaction module.

5. The system of claim 1, wherein the substrate comprises a refractory material foam.

6. The system of claim 1, wherein the system is symmetric about the reaction module.

7. The system of claim 1, wherein the first heat exchange region and the second heat exchange region are each filled with a heat storage medium.

8. The system of claim 7, wherein the heat storage medium is alumina.

9. The system of claim 7, wherein the first heat exchange region and the second heat exchange region are divided into subregions using baffle plates.

10. The system of claim 1, further comprising a first preheater between the first heat exchange region and the reaction module and a second preheater between the second heat exchange region and the reaction module.

11. The system of claim 10, wherein the first preheater and the second preheater each comprise a preheater substrate in electrical communication with a preheater electrode pair.

12. The system of claim 11, wherein the preheater substrate is substantially the same as the substrate of the reaction module.

13. A system comprising:
    a first heat exchange region;
    a reaction module comprising a substrate with catalytic material deposited on the substrate, wherein the substrate is in electrical communication with an electrode pair, wherein the substrate is operable to be heated via joule heating when an electrical current is passed between the electrode pair; and
    a second heat exchange region opposing the first heat exchange region across the reaction module, wherein the first heat exchange region, the reaction module, and the second heat exchange region are in fluid communication;
    wherein the first heat exchange region and the second heat exchange region are each filled with a heat storage medium.

14. The system of claim 13, wherein the reaction module is further configured to receive a second fluid, wherein the second fluid does not pass through the first heat exchange region or the second heat exchange region before entering the reaction module.

15. The system of claim 13, wherein the substrate comprises a refractory material foam.

16. The system of claim 13, wherein the system is symmetric about the reaction module.

17. The system of claim 13, wherein the heat storage medium is alumina.

18. The system of claim 13, wherein the first heat exchange region and the second heat exchange region are divided into subregions using baffle plates.

19. The system of claim 13, further comprising a first preheater between the first heat exchange region and the reaction module and a second preheater between the second heat exchange region and the reaction module.

20. The system of claim 19, wherein the first preheater and the second preheater each comprise a preheater substrate in electrical communication with a preheater electrode pair.

21. The system of claim 20, wherein the preheater substrate is substantially the same as the substrate of the reaction module.

* * * * *